United States Patent
Kern

(10) Patent No.: US 8,656,083 B2
(45) Date of Patent: Feb. 18, 2014

(54) FREQUENCY DISTRIBUTED FLASH MEMORY ALLOCATION BASED ON FREE PAGE TABLES

(75) Inventor: William Kern, Palo Alto, CA (US)

(73) Assignee: Spansion LLC, Sunnyvale, CA (US)

( * ) Notice: Subject to any disclaimer, the term of this patent is extended or adjusted under 35 U.S.C. 154(b) by 361 days.

(21) Appl. No.: 11/962,514

(22) Filed: Dec. 21, 2007

(65) Prior Publication Data

US 2009/0164702 A1 Jun. 25, 2009

(51) Int. Cl.
*G06F 12/00* (2006.01)

(52) U.S. Cl.
USPC ........... 711/103; 711/154; 711/170; 711/173; 711/202; 711/203; 365/185.33

(58) Field of Classification Search
USPC ................. 711/103, 154, 170, 173, 202, 203; 365/185.33
See application file for complete search history.

(56) References Cited

U.S. PATENT DOCUMENTS

| | | | | |
|---|---|---|---|---|
| 6,000,006 | A * | 12/1999 | Bruce et al. | 711/103 |
| 6,594,183 | B1 * | 7/2003 | Lofgren et al. | 365/185.33 |
| 6,904,494 | B2 * | 6/2005 | Beckert et al. | 711/103 |
| 6,973,531 | B1 * | 12/2005 | Chang et al. | 711/103 |
| 7,120,729 | B2 * | 10/2006 | Gonzalez et al. | 711/103 |
| 2005/0138272 | A1 * | 6/2005 | Liang et al. | 711/103 |
| 2006/0106972 | A1 * | 5/2006 | Gorobets et al. | 711/103 |
| 2006/0253645 | A1 * | 11/2006 | Lasser | 711/103 |
| 2007/0208904 | A1 * | 9/2007 | Hsieh et al. | 711/103 |

OTHER PUBLICATIONS

Tanenbaum, Andrew S., "Structured Computer Organization", 1984, Prentice-Hall, Inc., 2nd Edition, pp. 10-12.*

* cited by examiner

*Primary Examiner* — Arpan P. Savla
(74) *Attorney, Agent, or Firm* — Turocy & Watson, LLP

(57) ABSTRACT

Systems and/or methods that provide for frequency distributed flash memory allocation are disclosed. The systems and methods determine the rate at which a system address is being written and the current erase cycle state of each data block in the non-volatile memory device and assigns a physical address to the write operation based on the determined system address rate and the current erase state of each data block in the non-volatile system. In this regard, system addresses that are assigned more frequently are assigned physical page addresses from data blocks which have a low erase cycle state (i.e., greater cycle endurance remaining) and system addresses that assigned less frequently are assigned physical page addresses from data blocks which have a high erase cycle state (i.e., lesser cycle endurance remaining). The result is a more robust non-volatile device having increased erase/initialization cycle endurance, which adds to the overall reliability of the device over time.

17 Claims, 16 Drawing Sheets

1050

| Block Mapping Table 1050 | | | | | | |
|---|---|---|---|---|---|---|
| Block Number 1052 | Erase Count 1054 | Free Page Pool Mapping History 1056 | | | | Current State 1066 |
| | | L 1058 | LM 1060 | MH 1062 | H 1064 | |
| $EB_0$ | | | | | | |
| $EB_1$ | | | | | | |
| ⋮ | | | | | | |
| $EB_{N-1}$ | | | | | | |

FREQUENCY DISTRIBUTED FLASH MEMORY ALLOCATION BASED ON FREE PAGE TABLES

TECHNICAL FIELD

The subject innovation relates generally to memory systems and in particular to systems and methods for frequency distributed flash memory allocation based on free page tables.

BACKGROUND

A wide variety of memory devices can be used to maintain and store data and instructions for various computers and similar systems. In particular, flash memory is a type of electronic memory media that can be rewritten and that can retain content without consumption of power. Unlike dynamic random access memory (DRAM) devices and static random memory (SRAM) devices in which a single byte can be erased, flash memory devices are typically erased in fixed multi-bit blocks or sectors. Flash memory technology can include NOR flash memory and/or NAND flash memory, for example. NOR flash memory evolved from electrically erasable read only memory (EEPROM) chip technology, in which, unlike flash memory, a single byte can be erased; and NAND flash memory evolved from DRAM technology. Flash memory devices typically are less expensive and denser as compared to many other memory devices, meaning that flash memory devices can store more data per unit area.

Flash memory has become popular, at least in part, because it combines the advantages of the high density and low cost of EPROM with the electrical erasability of EEPROM. Flash memory is non-volatile; it can be rewritten and can hold its content without power. It can be used in many portable electronic products, such as cell phones, portable computers, voice recorders, thumbnail drives and the like, as well as in many larger electronic systems, such as cars, planes, industrial control systems, etc. The fact that flash memory can be rewritten, as well as its retention of data without a power source, small size, and light weight, have all combined to make flash memory devices useful and popular means for transporting and maintaining data.

When flash memory is used to provide a reliable and efficient secondary memory subsystem two characteristics must be considered. One characteristic of flash memory is that it can only write data in one direction, in other words, a "1" can become a "0" but a "0" can not then become a "1". The other characteristic of flash memory to be considered, often referred to as cycle endurance, is the number of times the addressable elements of the device can be erased and programmed before becoming unreliable. Both of these characteristics, which are related, adversely affect the reliability and the efficiency of the device.

In order to write data to a given location in a flash memory requiring a state opposite to that which the device supports requires the location be initialized. The initialization occurs as a result of the erase process; however, at some point in time, after numerous erase program cycles, a given location may either no longer be initialized to a known state or may no longer retain the data as written. As a result of having a finite number of times that a device can cycle between the erase (i.e., initialization) and program state before becoming unreliable, previous attempts to mitigate the problem have focused on extending storage persistence of the device by minimizing the number of erase program cycles.

In current flash memory devices the system writes to a particular address based on one-to-one relationship between the logical or system address and the physical address. If a particular address is used at a higher frequency than other addresses, which is characteristic of the one-to-one relationship, those locations will characteristically undergo more frequent erase program cycles. In addition to latency that is introduced by the write operation requiring initialization prior to recording, the flash memory device will eventually fail based over use of addresses having a higher erase program frequency (i.e., cycle endurance) while other addresses experience minimal erase program cycling.

FIG. 1 provides a timeline representation 100 of the read and write operations in conventional flash memory device utilizing a one-to-one relationship between the logical/system address and the physical address, in accordance with the prior art. This type of addressing relationship is generally beneficial in that it is simple to implement and provides for minimal latency experienced in determining the location of the data's physical address (i.e., the read operation). For example at block 104, a read operation 102 ensues by providing a system address "1001". At block 106, since the system address has a one-to-one relationship with the physical address, the physical address will be the same as the system address thus, as shown in this example, the physical address is also "1001". This one-to-one relationship allows for the system to retrieve the data from data store 108 in the location 110 designated as physical address "1001" without introducing any latency in the read operation.

However, as illustrated in FIG. 1, the conventional write operation 112 in a flash memory device utilizing a one-to-one relationship between the logical/system address and the physical address introduces significant latency due to the flash memory requiring initialization (i.e., erase) of the media prior to recording information. At block 114, a write operation ensues by providing a system address "1001". A read operation must precede the erase operation due to unit size difference of the erase operation versus the write operation. Thus at block 116, the system attempts to read all of the pages within the block indicated by physical address "1000" through "1002" into a volatile memory commonly referred to as a merge buffer. The reading of all pages within the block is indicated in data store 108 by location 118, which includes location 110 designated as physical address "1001".

Once all of the pages within the block have been read, the erase operation, indicated by block 120, ensues. The erase operation, which typically requires about ten times the amount of time required for the actual write operation, will erase all of locations 122 in data store 108 associated with physical addresses "1000" through "1002". Once the erase operation is complete, a merge operation, which combines the unchanged data from location 1000 and 1002 with the new data for location 1001, ensues to prevent the loss of data. As a result of the merge, the amount of data to be written is typically significantly larger that the size of the original write request. The merge operation is indicated by block 124 and results in the merged data from address "1001" merged into location 126 encompassing physical addresses "1000"-"1002" within data store 108. Once the data is merged, at block 128, the system writes out all of the pages back to the block, illustrated in the data store 108 as data residing in the "1001" location 110 and the "1000" and "1002" locations 118.

The write operation that occurs when a one-to-one relationship exists between the system address and the physical address exposes large amounts of data to possible loss in the event of loss of power during the write operation. This is because once the data is erased during the write operation it is no longer available and cannot be recovered. In addition, as previously mentioned, system addresses that are written at a high frequency will typically fail sooner due to cycle endurance limitations.

FIG. 2 provides an architectural overview of a system 200 utilizing flash memory having a one-to-one relationship between the system address and the physical address, according to the prior art. The host command interface 202 is operable to interpret commands for the device. If the command is a data command, the host command interface 202 sends the data to the Level 1 cache 204 in the volatile memory 206 through the host data interface 208 and the Level 1 data cache controller 210. The host command interface 202 is also in communication with flash management 212 and the host command interface 202 indicates to the flash management 212 the need to perform either a read operation from or a write operation to the data store 220. Based on the one-to-one address relationship, flash management 212 will receive the system address from the host command interface 202 and use the address as the physical address to read or write data.

If the command received from the host command interface 202 is a read command and the content is not located in the Level 1 cache, the flash management 212 will retrieve the data from the data pages 216 within the NAND memory 218 of the data store 220 via the data storage NAND media interface 222, store the retrieved data in the Level 1 cache 204 and inform the host command interface 202 of the data availability.

If the command received from the host command interface 202 is a write command, the flash management 212 will read all the data pages 216 in the block associated with the address into merge buffer 224, then erase the data from the location within the data pages 216 on the NAND memory 218 in the data store 220. Once erased the flash management will command a merge operation and the merged data is stored in the merge buffer 224 of volatile memory 226. Once the data is merged it is subsequently written to the location associated with the physical address in the data pages 216 of the NAND memory 218 of the data store 220.

The write operation that occurs when a one-to-one relationship exists between the system address and the physical address exposes large amounts of data to possible loss in the event of loss of power during the write operation. This is because once the data is erased during the write operation it is no longer available and cannot be recovered. In addition, as previously mentioned, system addresses that are written at a high frequency will typically fail sooner due to cycle endurance limitations.

Thus, a need exists to develop a method and system for erasing and writing data to flash memory that mitigates wear on the physical device. The desired method and system should serve to distribute writes across the media, thus limiting the number of erase operations to a specific location in the non-volatile flash memory. Thereby, lessening the likelihood of cycle endurance causing premature failure of the flash media.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods for frequency distributed flash memory allocation. The present systems and methods determines the rate at which a system address is being written and the number of times each block has been issued an erase command, or what is referred to herein as the current erase cycle state, and assigns a physical address to the write operation based on the determined system address rate and the current erase cycle state of each data block in the non-volatile system. In this regard, system addresses that are assigned more frequently are assigned physical page addresses from data blocks which have a low erase cycle state (i.e., greater cycle endurance remaining) and system addresses that assigned less frequently are assigned physical page addresses from data blocks which have a high erase cycle state (i.e., lesser cycle endurance remaining). As a result, less data has to be moved block-to block when recycling physical pages, commonly referred to garbage collection, and, as a result, less initialization, i.e., erase cycles, are incurred by the non-volatile device. The result is a more robust non-volatile device having increased erase/initialization cycle endurance, which adds to the overall reliability of the device over time.

In one aspect of the innovation, the data blocks are grouped in two or more data block pools, from which initialized—ready to write "free pages" are allocated, such that a pool is constituted to include data blocks having similar thresholds of erase cycle state. In this aspect, assignment of a physical address occurs by selecting the appropriate pool based on the rate at which a system address is written. As a result of grouping the data blocks in pools based on the current erase state, assignment of physical page addresses may be customized to store location contents based on the frequency with which those locations are changed.

In one aspect, a system for memory allocation in a computing system is defined. The system includes volatile memory, such as SRAM, DRAM or the like and non-volatile memory, such as flash memory, EEPROM or the like, which is in communication with the volatile memory. The non-volatile memory is characterized by data blocks, each data block including addressable physical pages. The system additionally includes a memory allocation module that is stored in the volatile memory and operable to allocate a physical page address to a system address. The memory allocation module includes system address rate logic operable to determine a frequency rate (e.g., a number of times in which a system address is written over a predetermined period of time) for a provided system address. The memory allocation module also includes erase cycle state logic operable to determine an erase cycle state (e.g., the current quantity of erase/initialization cycles that each addressable block has encountered) for each block in the non-volatile memory device. The memory allocation module additionally includes address assignment logic operable to assign a physical page address to the system address based on the determined frequency rate at which the system address is written and the erase cycle state of a block from which the physical page associated with the physical address resides.

In one aspect, the address assignment logic is further operable to assign a physical page address to the system address such that the frequency rate at which the system address is written is inversely proportional to the erase cycle state of the block from which the physical page resides. In this regard, system addresses that have a higher frequency rate are assigned physical pages from data blocks which have lower erase cycle states and system addresses that have a lower frequency rate are assigned physical pages from blocks which have higher erase cycle rates.

In another aspect of the system, the memory allocation module further includes data block pooling logic that is operable to group addressable blocks in two or more allocation pools, wherein each pool reflects addressable blocks having different thresholds of erase cycle states. In such aspects, the address assignment logic may be further operable to select a pool from which to assign a physical page address based on the determined frequency rate at which the system address is written and the erase cycle state thresholds for the pools. In one aspect, the address assignment logic may be further operable to assign a physical page address from a data block pool having a use frequency directly proportional to the determined frequency rate at which the system address is written. For example, system addresses that have a higher frequency rate are assigned from a higher frequency use data block pool (i.e., a pool more frequently selected for physical page address assignment/distribution) and system addresses that have a lower frequency rate are assigned from a lower frequency use data block pool (i.e., a pool less frequently selected for physical page address assignment/distribution). In a further aspect of the system the data block pooling is further operable to dynamically re-assign data blocks to different pools based on changes to the erase cycle state for one or more data blocks. For example, if a pool threshold of erase cycles is met for a given data block, the data block may be moved from a higher frequency use data pool to a lower frequency use data block pool.

A further aspect of present innovations is defined by an electronic device that includes a system for memory allocation in a computing system. The system includes volatile memory and non-volatile memory. The non-volatile memory is characterized by data blocks, each data block including addressable physical pages. The system additionally includes a memory allocation module that is stored in the volatile memory and operable to allocate a physical page address to a system address. The memory allocation module includes system address rate logic operable to determine a frequency rate for a provided system address. The memory allocation module also includes erase cycle state logic operable to determine an erase cycle state for each block in the non-volatile memory device. The memory allocation module additionally includes address assignment logic operable to assign a physical page address to the system address based on the determined frequency rate at which the system address is written and the erase cycle state of a block from which the physical page associated with the physical address resides.

The electronic device may include, but is not limited to, one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module (TPM), an electronic control unit associated with a motor vehicle, a global positioning satellite (GPS) device, an electronic device associated with an airplane, an electronic device associated with an industrial control system, a Hardware Security Module (HSM), a set-top box, a secure memory device with computational capabilities, or an electronic device with at least one tamper-resistant chip.

A further aspect of the present innovation is defined by a method for memory allocation in a non-volatile memory device. The method includes providing for a system address, determining a frequency rate at which the system address is written and determining an erase cycle state for each addressable block of a non-volatile memory device. The method further includes assigning a physical page address to the system address based on the determined frequency rate at which the system address is written and the erase cycle state of a block from which the physical page resides. In one aspect, determining a frequency rate at which a system address is written further includes determining a number of times in which a system address is written over a predetermined period of time. In another aspect, determining an erase cycle state further includes recording a quantity of erase cycles that each addressable block has encountered.

In a further aspect of the method, assigning a physical page address to the system address further includes assigning a physical page address to the system address such that the frequency rate at which the system address is written is inversely proportional to the erase cycle state of the block from which the physical page resides. In this regard, system addresses that have a higher frequency rate are assigned physical pages from data blocks which have lower erase cycle states and system addresses that have a lower frequency rate are assigned physical pages from blocks which have higher erase cycle rates.

A further aspect of the method may include grouping addressable blocks in two or more allocation pools wherein each pool reflects addressable blocks having different thresholds of erase cycle states and selecting a pool from which to assign a physical page address based on the determined frequency rate at which the system address is written and the erase cycle state thresholds for the pools. Thus, in one aspect of the method, assigning a physical page address to the system address further includes assigning a physical page address from a pool having a use frequency directly proportional to the determined frequency rate at which the system address is written. For example, system addresses that have a higher frequency rate are assigned from a higher frequency use data block pool and system addresses that have a lower frequency rate are assigned from a lower frequency use data block pool. In yet a further aspect the method may include dynamically re-assigning blocks to different pools based on the erase cycle state of each block. For example, if a pool threshold of erase cycles is met for a given data block, the data block may be re-assigned from a higher frequency use data pool to a lower frequency use data block pool.

As such, the present innovation provides improved systems and/or methods for frequency distributed flash memory allocation. The present systems and methods determines the rate at which a system address is being written and the current erase cycle state of each data block in the non-volatile memory device and assigns a physical address to the write operation based on the determined system address rate and the current erase state of each data block in the non-volatile system. In this regard, system addresses that are assigned more frequently are assigned physical page addresses from data blocks which have a low erase cycle state (i.e., greater cycle endurance remaining) and system addresses that assigned less frequently are assigned physical page addresses from data blocks which have a high erase cycle state (i.e., lesser cycle endurance remaining). As result, less data has to be moved block-to block when recycling physical pages, commonly referred to garbage collection, and, as a result, less initialization, i.e., erase cycles, are incurred by the non-volatile device. The result is a more robust non-volatile device having increased erase/initialization cycle endurance, which adds to the overall reliability of the device over time.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

FIG. 10B provides a block diagram of a block mapping table, according to an aspect of the present innovation.

DETAILED DESCRIPTION

Figure 1:
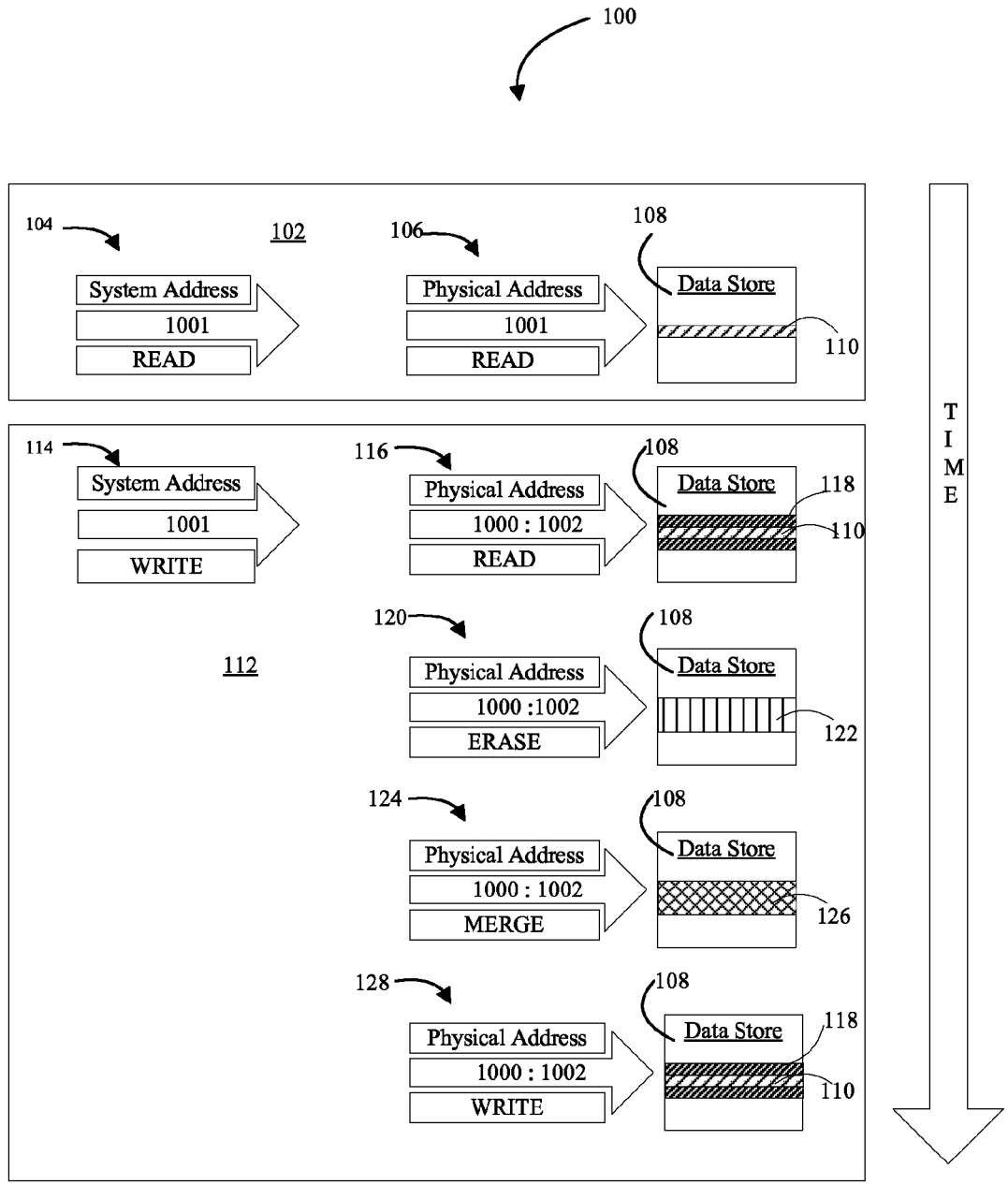
FIG. 1 illustrates a block diagram and associated timeline for conventional read and write operations in non-volatile memory, in accordance with the prior art.
Figure 2:
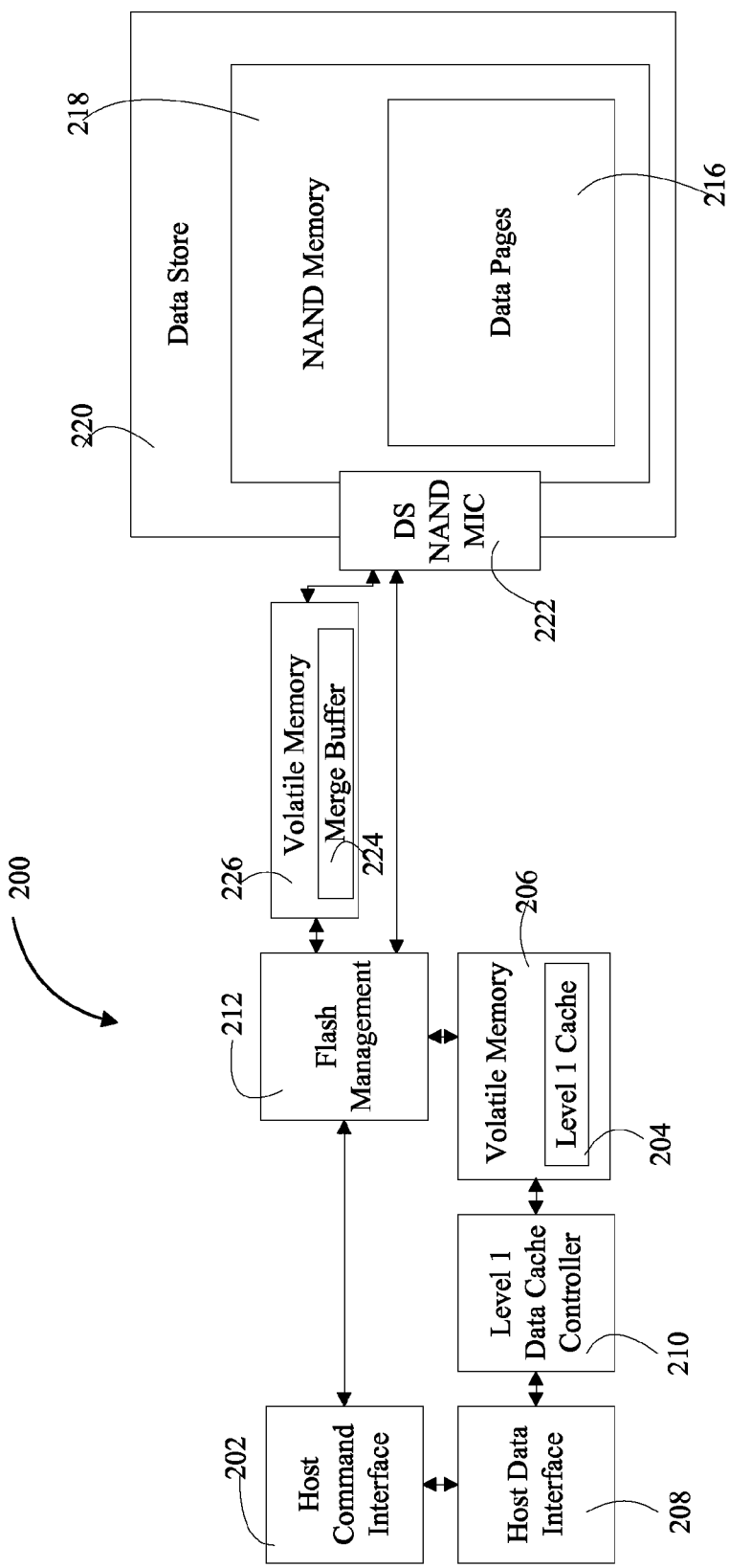
FIG. 2 illustrates a block diagram of a system for managing non-volatile memory operations, in accordance with the prior art.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

In accordance with the present innovations herein disclosed, a memory system is provided that remaps or decouples the system addresses/locations from the physical addresses/locations in order to distribute the use of the storage space throughout the media. By distributing data more evenly across the entire storage media, an increase in cycle endurance (i.e., the number of erase/program cycles that the media can support) may be realized, thus, providing a storage device having a greater overall lifecycle. Present aspects utilize system address-frequency distribution of memory allocation to limit the amount data that must be moved from block-to-block during a garbage collection operation. Movement of data pages from block-to-block may be required prior to initialization (i.e., a block erase operation) of pages, thus, by limiting the amount of data that must be moved an increase in cycle endurance results.

The disclosed subject matter relates to systems and/or methods for frequency distributed flash memory allocation. The present systems and methods determines the rate at which a system address is being written and the current erase cycle state of each data block in the non-volatile memory device and assigns a physical address to the write operation based on the determined system address rate and the current erase state of each data block in the non-volatile system. In this regard, system addresses that are assigned more frequently are assigned physical page addresses from data blocks which have a low erase cycle state (i.e., greater cycle endurance remaining) and system addresses that assigned less frequently are assigned physical page addresses from data blocks which have a high erase cycle state (i.e., lesser cycle endurance remaining). As result, less data has to be moved block-to block when recycling physical pages, commonly referred to garbage collection, and, as a result, less initialization, i.e., erase cycles, are incurred by the non-volatile device. The result is a more robust non-volatile device having increased erase/initialization cycle endurance, which adds to the overall reliability of the device over time.

In one aspect of the innovation, the data blocks are grouped in two or more data block pools, such that a pool is constituted to include data blocks having similar thresholds of erase cycle state. In this aspect, assignment of a physical address occurs by selecting the appropriate pool based on the rate at which a system address is written. As a result of grouping the data blocks in pools based on their current erase state, assignment of physical page addresses may be customized to store location contents based on the frequency with which those locations are changed.

Figure 3:
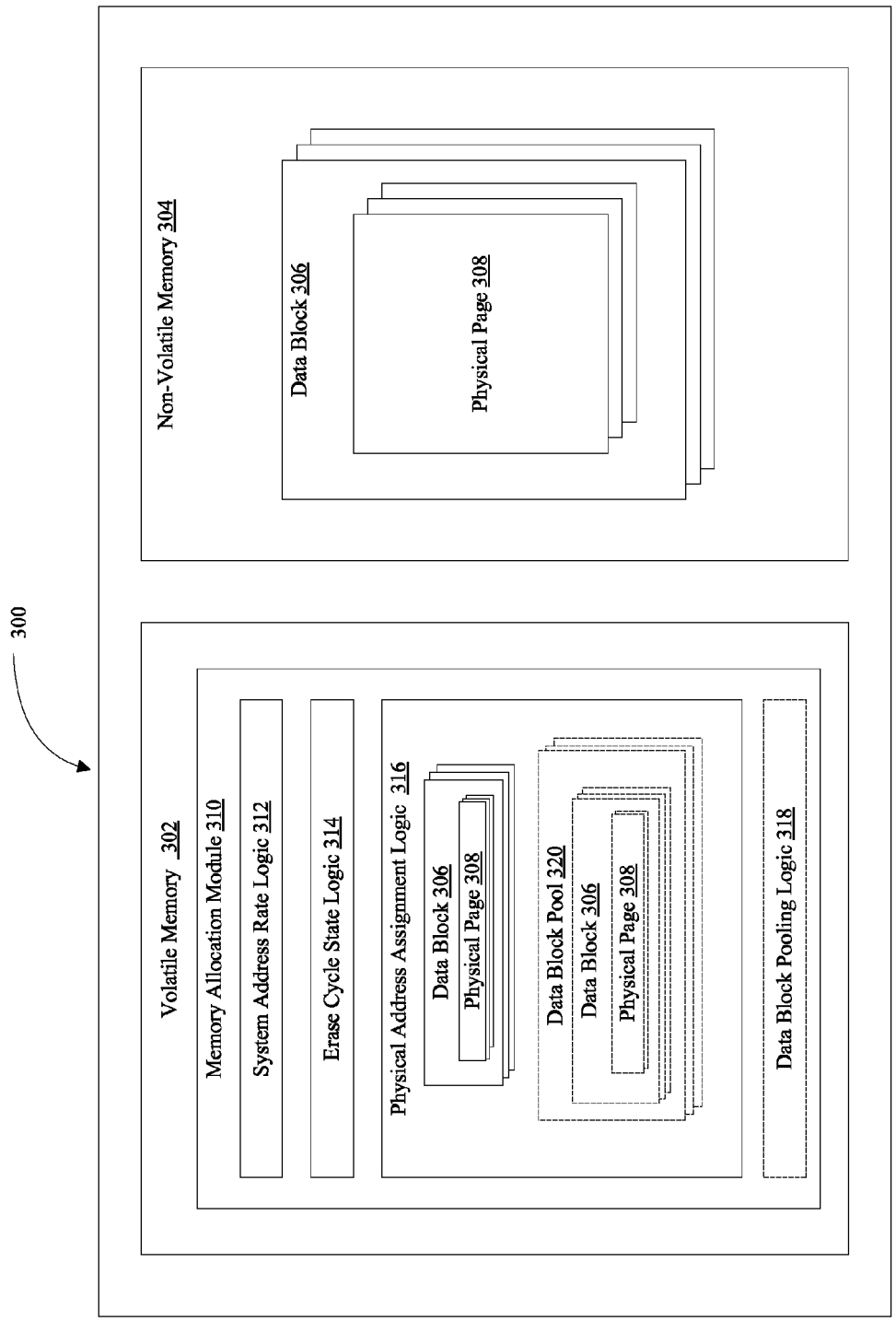
FIG. 3 illustrates a high-level block diagram of a system for frequency distributed memory allocation, in accordance with an aspect of the subject matter disclosed herein.
Figure 6:
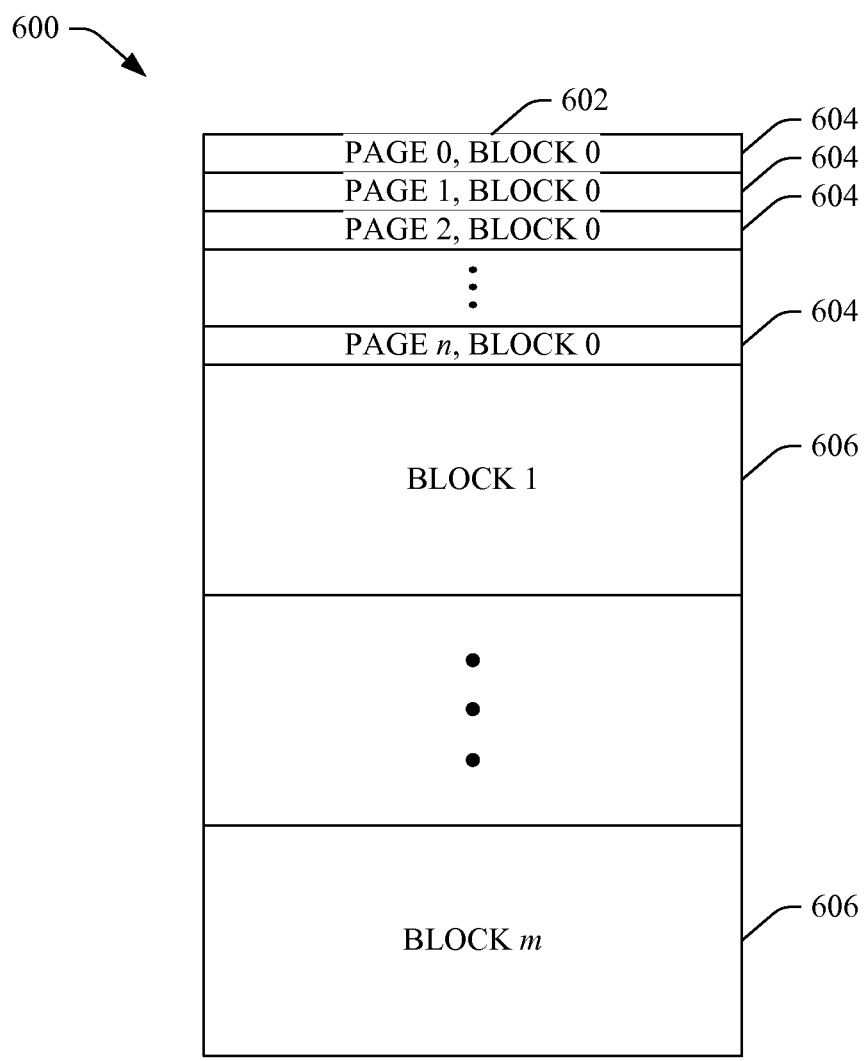
FIG. 6 depicts an example of a block diagram of a portion of a memory component, in accordance with an aspect of the disclosed subject matter.

Turning to the figures, FIG. 3 illustrates a block diagram depiction of memory system that utilizes system address-frequency memory allocation, in accordance with the present innovation. The system 300 includes volatile memory 302 and non-volatile memory 304. The non-volatile memory may include, but is not limited to, read-only memory (ROM), flash memory (e.g., single-level cell flash memory, multi-level cell flash memory), mask-programmed ROM, programmable ROM (PROM), Erasable PROM (EPROM), Ultra Violet (UV)-erase EPROM, one-time programmable ROM, electrically erasable PROM (EEPROM), and/or non-volatile RAM (e.g., ferroelectric RAM (FeRAM)). In one aspect of the innovation, the non-volatile memory 304 may comprise flash memory that may include NAND memory and NOR memory (not shown in FIG. 3). The volatile memory 302 may include, but is not limited to, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). As illustrated in FIG. 3, the non-volatile memory 304 will include multiple data blocks 306 with each data block 306 including multiple addressable pages 308. FIG. 6, discussed infra., provides a more detailed discussion of the relationship between blocks 306 and pages 308 in non-volatile memory 304.

The system 300 includes a memory allocation module 310 stored in the volatile memory 302 and operable to allocate the distribution of data to the non-volatile memory 304 based on the frequency rate that a given system address is supplied to the system 300. As such the memory allocation module 310 includes system address rate logic 312 that is operable to determine the frequency rate at which the system address is written. The frequency rate may be defined as the number of times in which a system address is written over a predetermined period of time. In accordance with one aspect of the present innovation, determining the frequency rate may be accomplished by recording the count of write operations for a translation table offset (TTO) and dividing the write count by an predetermined internal system time interval. A more detailed discussion of how the frequency rate is determined is discussed infra., in relation to FIG. 8.

The memory allocation module 310 additionally includes erase cycle state logic 314 that is operable determine an erase cycle state for each block 306 in the non-volatile memory 304. In this regard, the erase cycle state logic 314 is operable to track or otherwise record the quantity of erase cycles that each addressable block has encountered. In accordance with one aspect of the present innovation, determining the an erase cycle state for each block may be accomplished by recording the number of erase operations that a block has received in an erase block table along with the history of frequency use for the block and the current frequency. A more detailed discussion of how the erase cycle state is determined is discussed infra., in relation to FIG. 10B.

The memory allocation 310 additionally includes physical address assignment logic 316 that is operable to assign an address associated with physical page 308 to the system address based on the determined frequency rate at which the system address is being written and the erase cycle state of a block 306 from which the physical page 308 resides. In one aspect, the address assignment logic may be further operable to assign a physical page address to the system address such that the determined frequency rate at which the system address is being written is inversely proportional to the erase cycle state of the block from which the physical page resides. In this regard, system addresses that are determined to have a high frequency rate are assigned physical page addresses/locations from blocks which have a lower erase cycle state and system addresses that are determined to have a low frequency rate are assigned physical page addresses/locations from blocks which have a high erase cycle state. In one aspect of the innovation, assigning a physical page address to the system address may provide for use of translation tables and free page tables as discussed infra., in relation to FIG. 4.

In one optional aspect of the innovation, the memory allocation module 310 may include data block pooling logic 318 that is operable to group data blocks in two or more allocation pools such that a pool is composed of data blocks having different thresholds of erase cycle states. For example, in one specific aspect, the data block pooling logic 318 may be operable to group data blocks in four allocation pools, wherein a first pool includes blocks having the lowest erase cycle state (i.e., fewest initializations/erasures), a second pool includes blocks having a next lowest (e.g., medium low) erase cycle state, a third pool includes blocks having a second from highest (e.g., medium high) erase cycle state, and a fourth pool includes blocks having the highest erase cycle state. The data block pooling logic 318 may be further operable to dynamically re-assign blocks to different pools based on the erase cycle state of each block. For example, as a block incurs addition erase cycles and meets or exceeds a data block pool threshold, the block may be moved from a pool that includes lower erase cycle state blocks to a pool that includes higher erase cycle blocks.

In those aspects of the innovation that include data block pooling logic 318, the physical address assignment logic 316 may be further operable to select a data block pool 320 from which to assign a physical page 308 address based on the determined frequency rate at which the system address is being written and the erase cycle state thresholds for each pool. In one aspect of the innovation, the physical address assignment logic 316 may be operable to assign an address from a pool having a use frequency directly proportional to the determined frequency rate at which the system address is written. For example, a system address having a high frequency rate will be assigned a physical page address from a data block pool having a high frequency of use (i.e., a pool from which physical page addresses are assigned at a high frequency rate) and a system address having a low frequency rate will be assigned a physical page address from a data block pool having a low frequency of use (i.e., a pool from which physical page addresses are assigned at a low frequency rate).

It is to be appreciated and understood that, while system 300 is depicted with numerous memory components, the subject innovation is not so limited, and the subject innovation can contain less than the memory components shown, the same memory components as shown, or more memory components than are shown, as desired. In addition, the modules and logic described in relation to FIG. 3 may be embodied in hardware, firmware and/or any combination of hardware and/or firmware. Thus, use of the terms "module" and "logic" should not be construed as limiting, in that any component that is operable to provide the described function of the module and/or logic will be within the scope of the innovations herein described.

Figure 4:
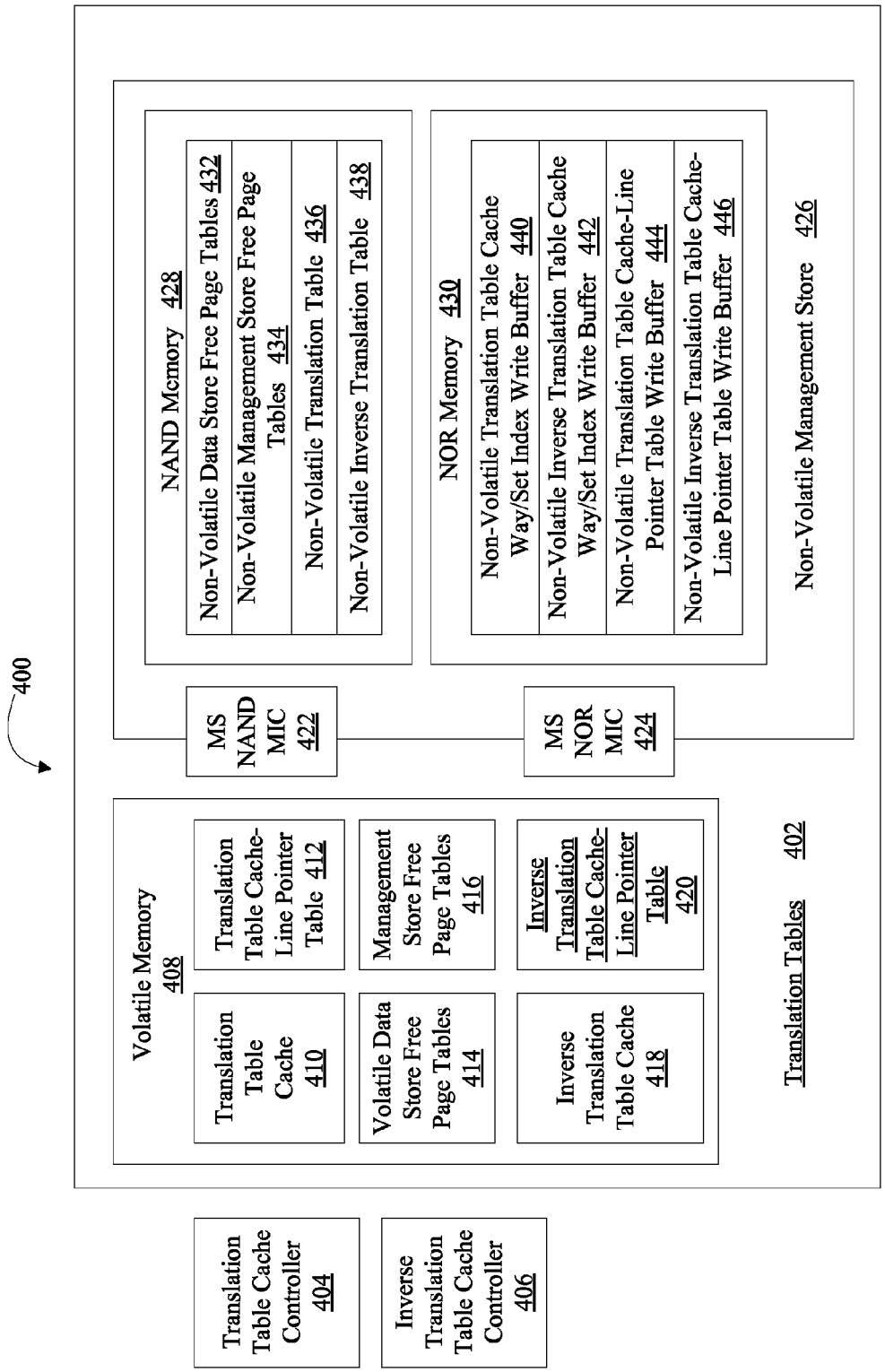
FIG. 4 illustrates a block diagram of a system managing non-volatile memory operations using a translation table that decouples the system address from the physical address/location, in accordance with an aspect of the disclosed subject matter.

FIG. 4 provides a block diagram representation of an exemplary system 400 utilizing translation tables 402 for decoupling the system address and physical address during non-volatile memory processing, according to an embodiment of the present innovation. The translation tables 402 are in communication with translation table cache controller 404 and inverse translation table cache controller 406. The translation table cache controller 404 and inverse translation table cache controller 406 may be embodied in individual devices, as depicted by the block diagram of FIG. 4, or, in alternate embodiments, the controllers 404 and 406 may be embodied in a single controller device. The translation table cache controller 404 is operable for controlling sections of the translation table that maps translations from system address to physical address and the inverse translation table cache controller 406 is operable for controlling sections of the inverse translation table from physical address to system address. The controllers 404 and 406 may also be responsible for providing eviction policy and coherency in terms of updating cache-lines and data elements as need be. It is to be further appreciated and understood that, while controllers 404 and 406 included therein, are depicted as stand-alone components, the subject innovation is not so limited, as the controllers 404 and/or 406 component 114 can be incorporated as part of other components, such as memory component 408 and/or other components (e.g., processor component).

Volatile memory, such as Dynamic Random Access Memory (DRAM), Static Random Access Memory (SRAM) or the like, may provide storage for the translation tables. In this regard, volatile memory may include the translation table cache 410 and the inverse translation table cache 418. The translation table controller 404 in conjunction with translation table cache 410 is operable to perform the translation of the system address to the physical address. In this regard, for read or write operations, the translation table cache 404 in conjunction with the translation table cache 410 may be operable to parse the system address into separate fields and perform a comparison to determine if the cache-line associated with the translation is in the cache. If the cache-line associated with the translation is not currently in the cache, the cache controller will issue a cache-line load operation and when the cache-line is loaded, the cache will provide the data store flash management (not shown in FIG. 4) with the physical address of the translation.

If the memory operation is a write operation, the translation table cache 410 will require a new physical address. As such the translation table controller 404 may access the volatile data store free page tables 441. The volatile memory 408 and, specifically the translation table cache 410 has access to the NAND memory 428 of non volatile management store 426 through management store NAND media interface controller 422. The data store free page tables 414 includes tables of pages available for write operations. In accordance with the present innovation, the available pages are blocks that have been erased and assembled so as to allow for faster overall write operations. For the write operation, the cache controller 404 will allocate a page (i.e., the physical address) from the data store free page tables 414 and provide the physical address to the data store flash management (not shown in FIG. 4). The volatile memory 408 and, specifically, the volatile data store free page tables 414 has access to the NAND memory 428 of the non-volatile management store 426 through management NAND media interface controller 422. The data store management will issue the write operation and when complete notify the translation table cache controller 404, which in turn updates the translation table cache 410 with the physical address provided from the free page table 414.

According to present embodiments, in addition to recording to the new physical address in the translation table cache 410, a bookend entry may also be recorded in the memory for the purpose of subsequent data recovery in the event of an error/failure during a subsequent memory operation, for example a power failure occurring during a subsequent write operation. The bookend entry includes the previous system address to physical address translation and the current system address to physical address translation. The bookend may be stored in the write buffer for the cache-line at the appropriate way/set index or data index location.

The volatile memory 408 also includes translation table cache-line pointer table 412 that is operable to manage the cache-line resource requirements and load/storage operations between the volatile translation table cache 410 and non-volatile translation table 436 in management store 426. The translation table cache-line pointer table 412 is a referencing mechanism that allows allocation of a cache-line for an update to the table. The translation table cache-line pointer table 412 is operable for managing the processes associated with maintaining the non-volatile state of the translation table cache-line pointer tables stored in write buffers 444.

The inverse translation table cache 418 includes the logical translations in the form of a mapping between the system addresses indexed by the physical addresses. The inverse translation table cache 418 is used to assist in identifying pages within a block within the non-volatile data store (not shown in FIG. 4) that facilitates the moving of the pages from block to block to make the block of interest available to be initialized (i.e., erased). The size of the physical to logical translation table, which is referred to as the inverse translation table, is proportional to the address space of the raw data store. The information in the elements of the inverse translation table is related to the current state of the physical page. There are three fields required for each element: the type, the value, and an integrity check. Of these fields, the value field is the largest in terms of size requirement and is context sensitive depending on the type field.

The volatile memory 408 also includes inverse translation table cache-line pointer table 420 that is operable to manage the cache-line resource requirements and load/storage operations between the volatile inverse translation table cache 418 and the non-volatile inverse translation table 438 in management store 426. The inverse translation table cache-line pointer table 420 is a referencing mechanism that allows allocation of a new cache-line for an update to the table. The inverse translation table cache-line pointer table 420 is operable for managing the processes associated with maintaining the non-volatile state of the inverse translation table cache cache-line pointer tables stored in write buffer 446.

As previously mentioned, the management store 426 may include NAND memory 428 and NOR memory 430. The NAND memory may include data store free page tables 432, which provide a mapping of available blocks and/or pages of initialized, ready to be written pages/blocks. The data store free page tables 432 are maintained in non-volatile memory so that for subsequent write operations, which occur during different power-on cycles, accurately reflect the mapping of the pages/block ready to be written. The pages/blocks from the data store free page tables 432 are read out during boot-up to the volatile data store free page tables 414. The NAND memory 428 additionally includes management store free page tables 434, which provide the allocation resource and mechanism for the free page tables 434 to include the metadata stored in the non-volatile management store 426. In this regard, blocks of available memory must be initialized in order to be allocated and the tables 434 identify initialized areas of memory in the management store 426. The NAND memory will also store the translation tables 436 and the inverse translation tables 438.

The management store 426 additionally includes NOR memory 430, which includes write buffers, such as translation table write buffer, reflecting the architecture of the cache (i.e., a cache way/set index write buffer 440 and inverse translation table cache way/set index write buffer 442. As previously mentioned, in accordance with present embodiments, the way-set indexes serves as markers for identifying logical to physical translation changes in the memory operations, such as write operations and the like. In this regard, the way/set index write buffers 440 and 442 are relied upon in the event of a memory operation failure, such as a power loss or the like, to provide the impetus for data recovery.

Additionally, the NOR memory of 430 management store 426 may include translation table cache-line pointer table write buffer 444 and inverse translation table cache-line pointer table write buffer 446, which maintain the pointers to the cache-lines that compose the tables stored in the non-volatile memory and, as such, insure a robust power-safe translation operation.

Figure 5:
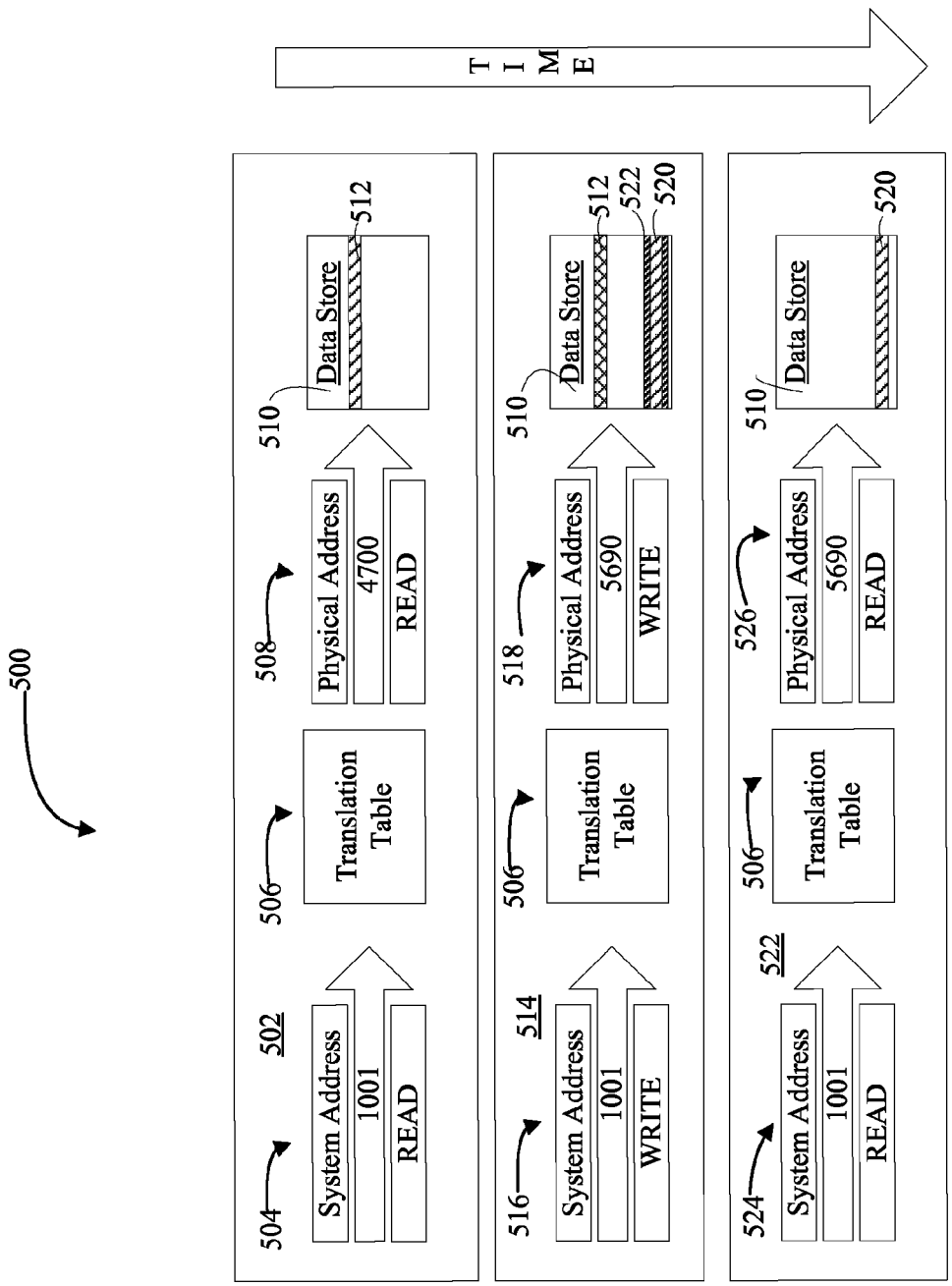
FIG. 5 is a block diagram and associated timeline for read and write operations in non-volatile memory utilizing a translation table that decouples the system address from the physical address/location, in accordance with an aspect of the disclosed subject matter.

FIG. 5 provides a timeline representation 500 of the read and write operations in a flash memory device in which the system address is decoupled from the physical address and requires a translation table for mapping the system address to the physical address, in accordance with an embodiment of the present innovation. For example at block 504, a read operation 502 ensues by providing a system address "1001". A translation table 506, which maps system addresses to physical addresses, is applied to the system address "1001" to decouple the system address from the resulting physical address. At block 508, as a result of applying the system address to the translation table 506, the resulting decoupled physical address is "4700". The data is retrieved from the data store 510 at the location 512 associated with physical address "4700".

The write operation 514 that occurs when the system address is decoupled from the physical address introduces far less latency into the process than is realized in conventional systems in which the system address and the physical address are in a one-to-one relationship. This is because the initialization process (i.e., the erase operation) required by the non-volatile memory to be performed prior to recording information may be performed as a background task, thus eliminating the need to perform erase, and should it be needed, minimizing the amount of data for merge operations within the write operation. For example, at block 516, at a subsequent point in time, a write operation ensues by providing the same system address "1001" that was previous provided in the read operation 502. The translation table 506 is employed to map the system address to a decoupled physical address. At block 518, as a result of applying the system address to the translation table 506, the resulting decoupled physical address for the write operation is "5690". The data is written into the location 520 within the free space 522 of data store 510.

It is noted during and after the subsequent write operation 514 the previous data associated with system address "1001" remains in the location 512 of the data store 510 associated with physical address "4700". Once the write operation 514 ensues or has been completed, the data associated with location 512 is no longer accessible to the system but is accessible internally. By allowing the data to remain in the location during or after subsequent write operations, the previously recorded data is recoverable if the system should lose power during the write operation or otherwise experience a failure during the read operation.

A subsequent read operation 522, ensues at block 524, at which a system address of "1001" is input. The translation table 506 is applied to the system address "1001" to decouple the system address from the resulting physical address. At block 526, as a result of applying the system address to the translation table 506, the resulting decoupled physical address is "5690". The data is retrieved from the data store 510 at the location 520 associated with physical address "5690".

The illustrated translation table processing and decoupling of system address to physical address results in a storage system capable of mitigating cycle endurance limitations. This is because, unlike conventional systems that write high frequency system addresses to the same location in the data store, the present innovation provides for high frequency system addresses to be written to different locations within the data store based on the translation table's ability to decouple the system address from the physical address.

In addition, as a result of the system illustrated in FIGS. 4 and 5 various advantages can be realized in terms of mitigating latency during the write operation. For example, the initialization (i.e., the erase operation) of the flash media may be performed as a background task prior to recording information, as opposed to part of the write operation. In addition, when the requested length of a write operation is less than the unit size for the device write command, the resulting amount of data in the read/merge/write process is only the size of the write command.

Additionally, the system illustrated in FIGS. 4 and 5 provide the basis for recovering data in the event of power loss or any other failure in the write operation. This is because, as shown in FIG. 5, data previously mapped, while not available to the system is available internally for the purposes of recovery.

Turning to FIG. 6, depicted is a block diagram of a portion of a memory 600 that can facilitate storage of data in accordance with an aspect of the disclosed subject matter. The memory 600 can be comprised of a memory array 602 that can contain a plurality of pages 604 that can be comprised of and/or associated with memory cells (not shown) in which data can be stored. Each page 604 can store a predetermined number of bits of data. Each page 604 can include a portion of the page 604 that can store data, such as user data, and a portion of the page 604 can store spare data, such as metadata, wherein, for example, the required data store integrity check, such as ECC, to determine if the write operation was successfully completed or not.

The memory array 602 can also contain a predetermined number of blocks 606 wherein each block 606 can contain a predetermined number of pages 604. For example, in one embodiment, there can be 512 pages 604 per block 606. In one aspect, the memory 600 can be a respective portion of, can be the same or similar as, and/or can include the same or similar functionality as the memory components shown in FIG. 3. In another aspect the memory 600 can comprise a non-volatile memory (e.g., single-level cell flash memory, multi-level cell flash memory).

Figure 7:
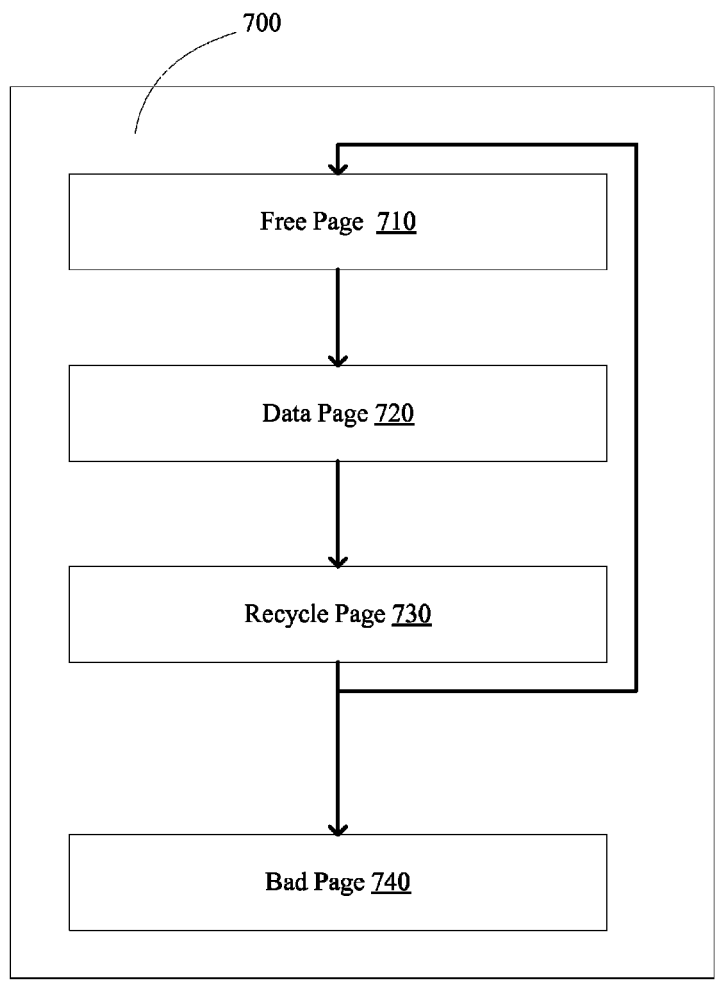
FIG. 7 depicts a block diagram of a physical page lifecycle, in accordance with an aspect of the present innovation.

Turning to FIG. 7, depicted is a simplified block diagram of a physical page lifecycle 700, according to aspect of the present innovation. As shown in FIG. 7, there are four states that physical page exists in during the course of its lifetime: free page state 710, data page state 720, recycle page state 730, and bad page state 740.

Free page state 710 represents a page that is available to be written. In the free page state 710, the page exists as an object in the memory management system where it can serve as the destination target in a write operation. For the page to be in the free page state 710 the block where the page resides has to have been successfully erased (i.e., initialized). When in the free page state 710 the page is generally not accessible by the computing system.

Data page state 720 represents a page that includes system data that is accessible to the computing system via the translation table process. To be available to the computing system implies that the page in the data page state 720 has been written and the corresponding physical page address is part of an element in the translation table that maps system logical (i.e., the system address) to device physical locations (i.e., the physical address). In data page state 720 the page may be read as many times as required.

Recycle page state 730 represents a page that includes system data that is no longer available to the computing system via the translation table process. To be in the recycle page state 730 the system logical location (i.e., the system address) must have been supplanted by a subsequent write request from the host system. In other words, the subsequent write request results in a different device physical location (i.e., physical address).

Bad page state 740 represents a page that has failed in a write operation, or is part of a block that has been identified as defective as a result of an erase operation failure or, in some instances manufacturing defect. When a block is identified as bad all of the pages with the block are assumed to be in the bad page state 740 or unreliable and are therefore marked accordingly. Pages in the Bad page state 740 are not accessible by the computing system.

The relationship between the page states and how to best organize the pages are paramount to overall memory management. From the memory allocation perspective, pages that are ready for use need to be allocated in a distributed fashion. From a de-allocation perspective, pages that are no longer of use (i.e., the data held in those locations is not current) must be reclaimed (i.e., recycled) and made ready to be used. In this regard, the distributed nature associated with write process must be reversed in order to re-initialize (i.e., erase) the memory for future use.

When a block is erased successfully all of the pages within the block are initialized and thus in a free page state 710. As write requests from the system are processed and the pages from the block become mapped, the page changes from free page state 710 to data page state 720. If, and when, a system address that is mapped to a page in the data page state 720 is written again, the state of the page changes from data page state 720 to recycle page state 730. In addition, some other free page 710 is mapped to the system address and it changes from free page state 710 to data page state 720. In the event that a page fails to write successfully, the page changes from the free page state 710 to the bad page state 740. If an erase operation should fail then all of the pages in the block are set to the bad page state 740.

Figure 8:
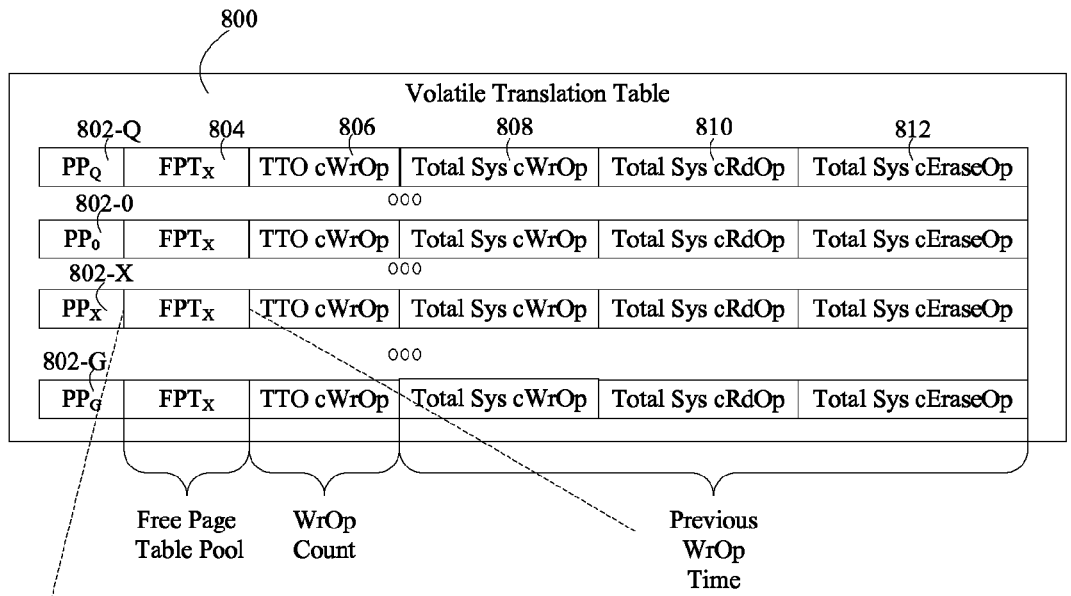
FIG. 8 depicts a block diagram of a volatile memory translation table, according to an aspect of the disclosed subject matter.

Referring to FIG. 8, a block diagram of a volatile memory translation table 800 is depicted, according to aspects of the present innovation. Translation table 800 depicts physical page entries 802, such as $PP_Q$ 802-Q, $PP_O$ 802-0, $PP_X$ 802-X and $PP_G$ 802-G. When a system address is converted into a translation table offset it is used as an index into the translation table 800. In addition to being able to provide the physical address location associated with the logical system address if the operation is a write then the count of write operations 806 for the TTO is recorded. Each time a write operation occurs the frequency of write operations is calculated to set the Frequency Page Table 804 value. The Frequency Page Table value 804 identifies the pool from which the allocation of the free page will occur. The write count 806, divided by an internal system time provides a frequency rate for the system address. In some aspects time may be based on a conventional timer or, in other aspects, a calculated value, as in this case owing to the desire to avoid the power required to run such a circuit. The calculation of time may be based on total number of system write operations 808 multiplied by a constant associated with a typical period for a write operation (not illustrated), plus the total number of system read operations 810 multiplied by its typical period for read operations (not illustrated), plus the total number of system erase operations 812 multiplied by its typical period for the erase operation (not illustrated). In aspects that utilize this time calculation the resulting time value is an approximation of time but adequately serves the purpose of frequency identification and saves power.

Figure 9:
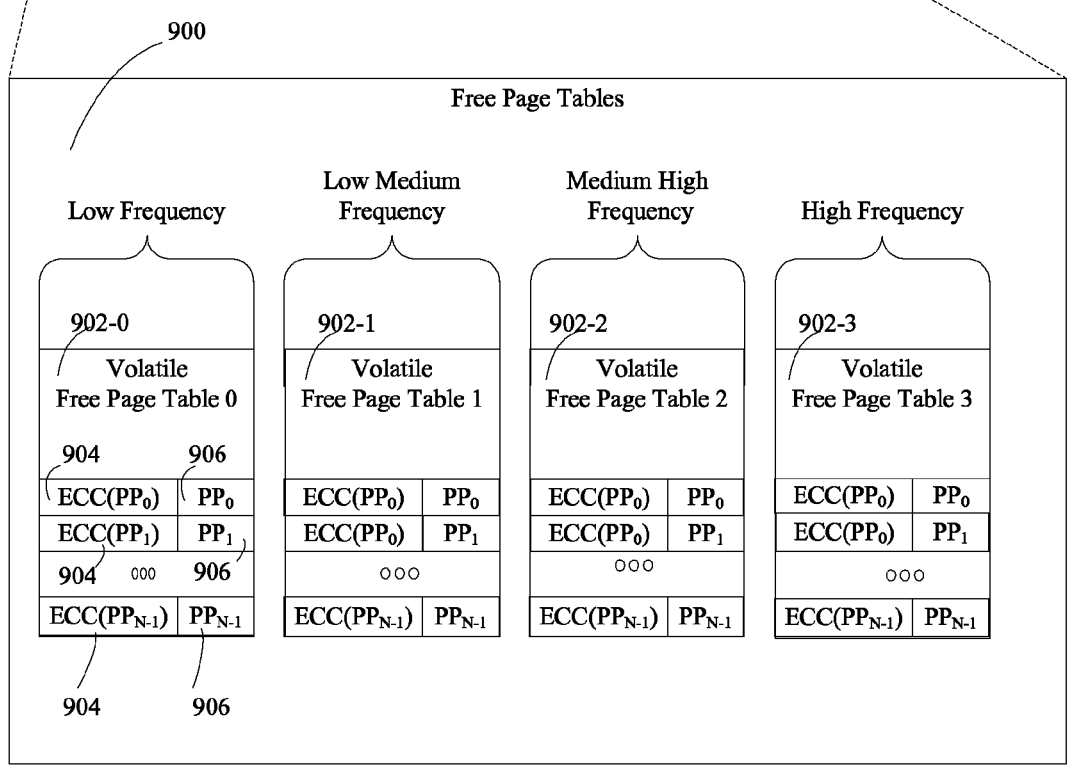
FIG. 9 illustrates a block diagram of the organization of free page tables, according to an aspect of the subject matter herein disclosed.

FIG. 9 is a block diagram illustrating free page tables 900, according to an aspect of the present innovation. The Frequency Page Table value 804 identifies the pool from which the allocation of the free page will occur. FIG. 9 illustrates an implementation of frequency distributed free page tables using four pools from which a free page will be allocated for a write operation. Each pool will differ from corresponding pools based on predetermined thresholds for erase cycle state of the pages within a given pool. In the illustrated example of FIG. 9, a first pool having a low use frequency is represented by free page table 0 902-0, a second pool having a low medium use frequency is represented by free page table 1 902-1, a third pool having a medium high use frequency is represented by free page table 2 902-2 and a fourth pool having a high use frequency is represented by free page table 3 902-3. Each element in a Free Page Table, such as Free Page Table 0 902-0 and the like, is composed of two parts: a physical page address 906 in the data store (not shown) that has been initialized by an erase operation and the error correcting code value 904 associated with the physical page address 906. An index into the frequency page (not shown) is used to identify the next available location for a given pool and is incremented before the page location is returned to the process that uses the address for storing data.

Figure 10A:
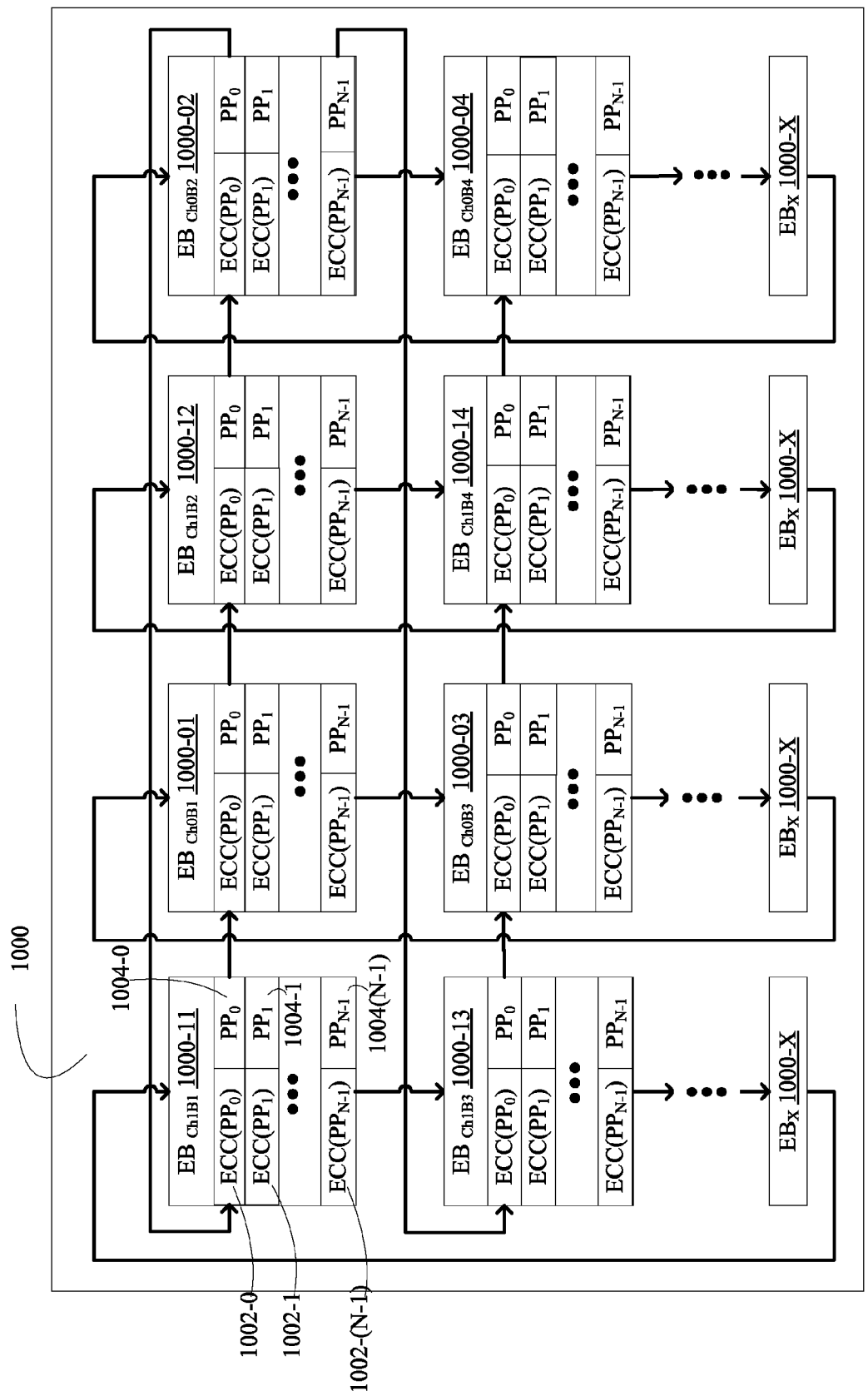
FIG. 10A depicts a block diagram of a volatile free page table/data block pool, according to an aspect of the present innovation.

Turning to FIG. 10A, a block diagram of a free page table 1000 (such as elements 902 of FIG. 9) is depicted, according to an aspect of the present innovation. In some aspects, the nature of the underlying hardware in the system may provide for the ability to issue operations in parallel, as such the organization of the Free Page Tables may be constructed to take advantage of this type of parallelism. The pages, $PP_0$ 1004-0, $PP_1$ 1004-1 and $PP_{(N-1)}$ 1004-(N-1) included within $EB_{Ch1B1}$ 1000-11 come from an erase block addressed by a system bus (not shown) at location Channel 1 Bank 1. Similarly, the pages included within $EB_{Ch0B1}$ 1000-01 come from an erase block addressed by a system bus (not shown) at location Channel 0 Bank 1, the pages included within $EB_{Ch1B2}$ 1000-12 come from an erase block addressed by a system bus (not shown) at location Channel 1 Bank 2, the pages included within $EB_{Ch0B2}$ 1000-02 come from an erase block addressed by a system bus (not shown) at location Channel 0 Bank 2, the pages included within $EB_{Ch1B3}$ 1000-13 come from an erase block addressed by a system bus (not shown) at location Channel 1 Bank 3, the pages included within $EB_{Ch0B3}$ 1000-03 come from an erase block addressed by a system bus (not shown) at location Channel 0 Bank 3, the pages included within $EB_{Ch1B4}$ 1000-14 come from an erase block addressed by a system bus (not shown) at location Channel 1 Bank 4 and the pages included within $EB_{Ch0B4}$ 1000-04 come from an erase block addressed by a system bus (not shown) at location Channel 0 Bank 4.

The free page table 1000 is used when a page allocation is required in response to a write operation request, the table current index (not shown) is employed to identify the block, such as $EB_{Ch1B1}$ 1000-11, and the element within that block to use. For example, if the index points to the first element in block $EB_{Ch1B1}$ 1000-11 containing a physical page address $PP_0$ 1004-0 and an ECC 1002-0 value, then the information from that element will be read out from the table and its contents will be verified. Assuming the ECC 1002-0 is valid the physical page address $PP_0$ 1004-0 will be provided to the process that will write the data to the data store and the table index (not shown) will be incremented to point to the next element in the table 1000. When the next write operation request for the same frequency is issued the element from the table at the given table index (not shown) will be used. If a device can only execute one write operation at a time (serial write operation only—it does not support concurrent write operations), then that device will be blocked from servicing another write request until such time as the preceding write operation has completed. In order to remove the potential delay associated with providing the next physical page address from a device of this type, the organization of the table may be constructed to provide the subsequent physical addresses from another device. The table 1000 illustrates an organization for supporting devices that only support serial write operations by providing a physical page address using another device for subsequent requests. In the case of using an element from $EB_{Ch1B1}$ 1000-11, the next request would be serviced from $EB_{Ch0B1}$ 1000-01.

FIG. 10B provides a block diagram of a block mapping table 1050, according to an aspect of the present innovation. In order to save the erase history of the data blocks the block mapping table 1050 is used. Block mapping table 1050 is indexed using a physical address of the data block, indicated by block number field 1052. The physical address $EB_0$ 1052-0 indexes into the first location in the table. For each data block in the system there exists an entry in block mapping table 1050. The number of erase operations that have been issued to $EB_0$ 1052-0 is recorded into the table element erase count field 1054. In addition to the number of erase operations that have been issued to a given data block in the system, table 1050 provides for a free page mapping history 1056, which indicates a history of the frequency pool that the data block has been associated with. In the illustrated example of FIG. 10B, four frequency pools are shown from which to make page allocations from. The number of times a data block has been placed in the low frequency pool is accounted for in the L field 1058. The number of times a data block has been place in the medium low frequency pool is accounted for in the LM field 1060. The number of times a data block has been place in the medium high frequency pool is accounted for in the MH field 1062. The number of times a data block has been place in the high frequency pool is accounted for in the H field 1064. In order to determine the current frequency pool a data block is assigned the current state field 1066 is marked accordingly.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 11:
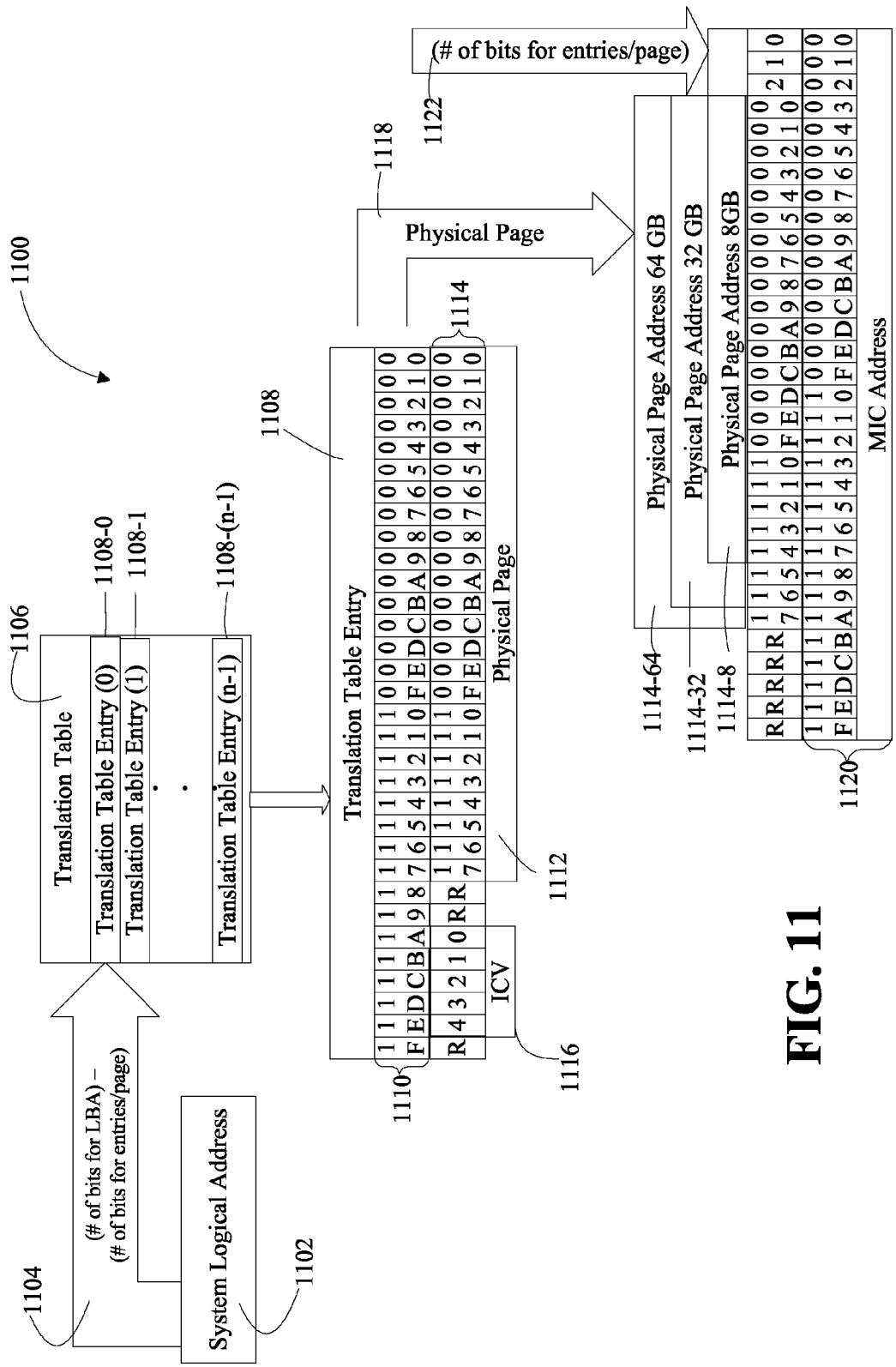
FIG. 11 illustrates a block diagram of a system for system/logical address to physical address translation, in accordance with an aspect of the disclosed subject matter.

FIG. 11 provides a block diagram representation of a system 1100 for logical address to physical address translation, according to aspects of the present innovation. The process of a read operation utilizing the address translation is initiated by inputting a system logical address 1102 into the translation table 1106. The inputting of the system logical address into the translation table is represented by arrow 1104. As indicated in the arrow 1104 of FIG. 11, (# of bits for LBA)—(# of bits for entries/pages), this signifies that the page (i.e., the unit of read and write in the non-volatile storage media) is typically larger than the Logical Block Address (LBA) (i.e., the unit of read and write for the system). As a consequence, the contents of multiple logical block addresses may fit within a page. For example, a page may be 4096 bytes and an logical address may be 512 bytes, therefore the contents of 8 logical block addresses can be read and/or written for each page read and/or write. The translation table includes translation table entries 1108, such as translation table entry (0) 1108-0, translation table entry (1) 1108-1, up to and including translation table entry (n−1) 1108-(n−1), when n equals the maximum logical block address operation. The size of the translation table is proportional to the maximum address value reported to the system and the ratio of logical to physical mapping imposed or implemented, times the element size.

Each translation table entry 1108 is indexed by a trucated system logical address 1104 to an associated translation table entry 1114 composed in part by a physical page 1112. In addition the entry 1108 may include an integrity check vector, such as an Error Correction Code (ECC) 1116, which insures the integrity and validity of the translation table entry 1108 and may be used to validate the completion of a write operation in the event of an error or failure occurring during the write operation. The size of the entries depends primarily on two factors: the physical storage location address 1114 size and the size of an integrity check vector 1116 used to provide error detection and correction capability to guard this critical information. Given a minimum datum size provided by the media interface controller as 32-bits the element size uses a minimum 4 bytes per element.

As an example, if the maximum address value reported is 227 (64 GB, assuming 512 bytes/address), and using a ratio 23 to 1 logical to physical location, then the element count required for the table is $2^{(27-3)}$ or 16 mega-entries. In other words, the physical storage location address 1114 size requires a 24-bit field. This leaves 8 bits for the integrity check value and an optional reserved field (shown in FIG. 8 as fields "R").

Once an entry is found in the translation table 1108 for the inputted system logical address 1102, the entry is provided to a controller (not shown in FIG. 8). The arrow 1118 represents the process of providing the physical page information 1112 from the translation table entry 1108 to the controller.

The controller includes a mapping of physical page addresses to media interface controller (MIC) addresses 1120 for the purpose of issuing command sequences to execute the given operation. The length of the physical page address is dictated by the size of the physical page. For example, a 64 GB physical page address 1114-64 will include a 24-bit field, a 32 GB physical page address 1114-32 will include a 23-bit field and an 8 GB physical page address 1114-8 will include a 21-bit field. Additional bits are assumed to be zero for the number of bits for entries per page, as illustrated by arrow 1122.

Figure 12:
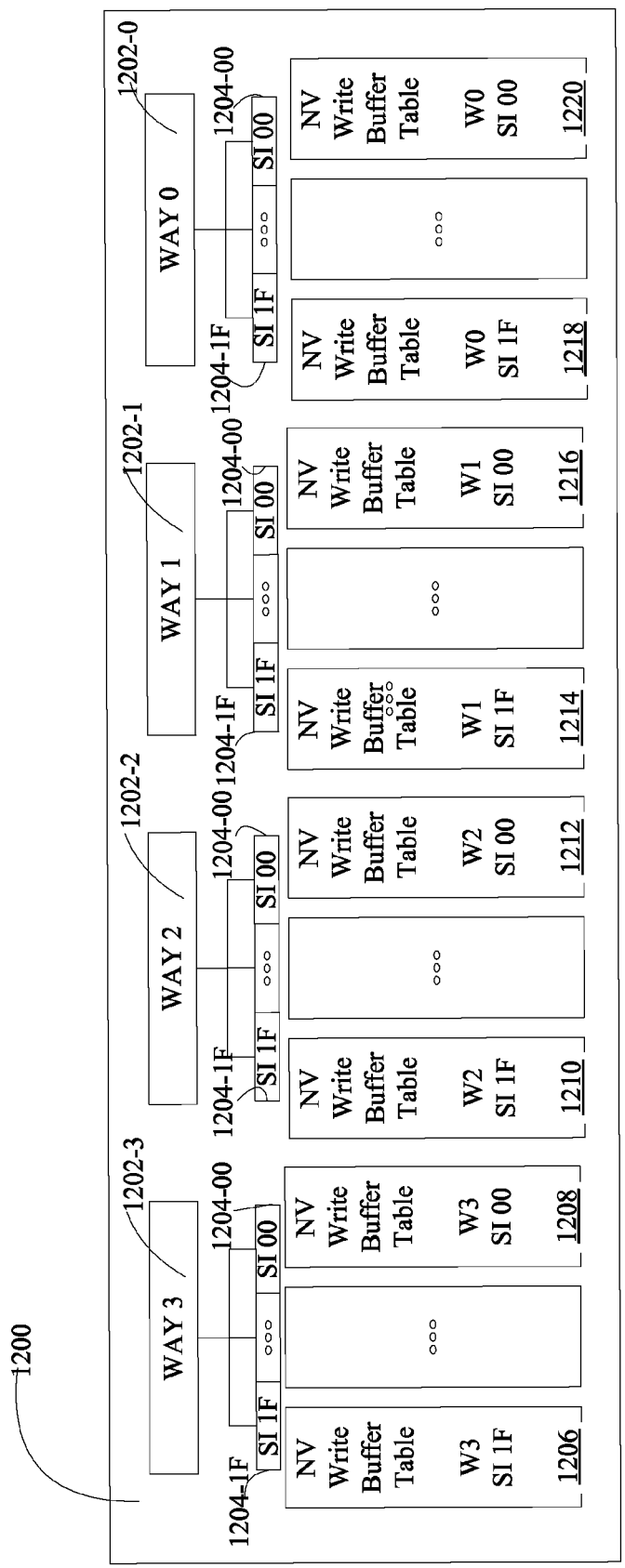
FIG. 12 depicts a block diagram of a logical/system address to physical address translation table write buffer, illustrating way-set indexing, in accordance with an aspect of the disclosed subject matter.

FIG. 12 is a block diagram representation of the translation table write buffer based on using a 4-way set associative architecture for the translation table cache, according to an aspect of the present innovation. The elements of the cache are portions of the translation table for which the system is requesting either a read or write operation. Since the part of the table in the cache is small compared with the total size of the translation, the organization of the cache plays a significant role in system performance. The organization of the cache is established based on the portion of the logical system address used as an index into the translation table. This index is referred to as the translation table offset (TTO). The TTO is partitioned into three pieces: the Tag field, the Set Index, and the Data Index. When applied to the cache, these fields are examined in parallel to identify if the cache-line represented by the value is resident in the cache.

The process to determine if a value is in the cache uses the Set Index to identify in each Way if a valid cache-line exists and if the Tag field for that cache-line matches with the Tag field of the requested element. When a match is found, meaning a cache hit occurred, then the operation proceeds, otherwise a cache miss must be processed.

The cache-miss process implies a cache-line must be read in from non-volatile memory. If a location in the cache exists for the new cache-line to be stored once it has been read in then the process may proceed once the information of interest is available, otherwise a location must be determined. This location is dependent on what is referred to as the eviction policy of the cache.

When a location in the cache does not exist then a cache-line must be evicted from the cache. When the data in the cache-line has not been modified (i.e., no write operations were performed) the required eviction incurs no need to write to non-volatile storage; however, if it has been modified from the time when it was originally read from non-volatile memory then the modified cache-line must be saved off into non-volatile memory. This can occur in one of two ways. The first approach is to use the contents of the modified cache-line as the source of the information to be stored into the new cache-line section of the table. The second approach, which is relevant to the present innovation and is used when an error or failure occurs during the write operation, is to take the original information in the non-volatile memory into a merge buffer and overlay the contents of the write buffer, after filtering for duplicate addresses, to provide the source of the changed information.

Whenever a write operation is requested for a system logical address the existing translation content is written to a write buffer. This is one bookend in the translation process. Following this operation a new physical address is acquired from a free page table and this provided to the data store flash management module to use as the location to write the system data. When the write operation has completed successfully, the data store flash management indicates to the translation table process the success of the operation. The translation table process updates the translation information at the appropriate cache-line, using the way, set index, and data index as the location. In addition, to reflect the change of translation in a power safe manner, the other transaction bookend must be written to the write buffer to complete the recording of the transaction.

In FIG. 12, the way information 1202-0, 1202-1, 1202-2 and 1202-3 points to a specific bank in the write buffer which is associated with the current contents of that way of the cache. To further refine the location to record the transaction, the set information, 1204-1F-1204-00 points to a specific bank within the associated way information. Within the specified bank transactions are recorded into a write buffer (e.g., write buffers 1206-1208 for corresponding way information 1202-3, write buffers 1210-1212 for corresponding way information 1202-2, write buffers 1214-1216 for corresponding way information 1202-1 and write buffers 1218-1220 for corresponding way information 1202-0). By organizing the location for transaction write buffer information in this manner, the process of identifying the translation is greatly simplified should a recovery be necessitated.

Figure 13:
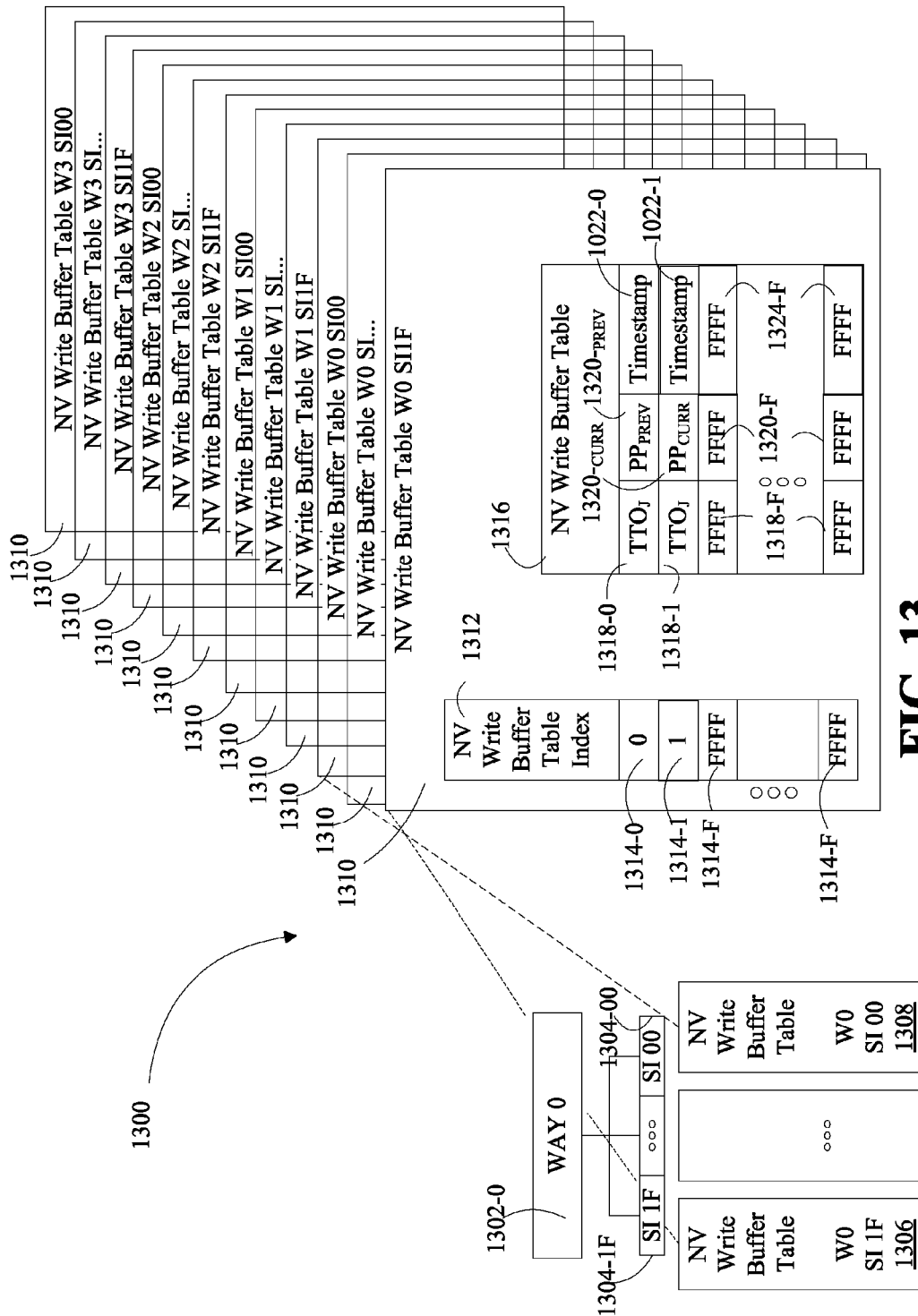
FIG. 13 depicts a block diagram of way/set index in a logical/system address to physical address translation table write buffer, according to an aspect of the present innovation.
Figure 14:
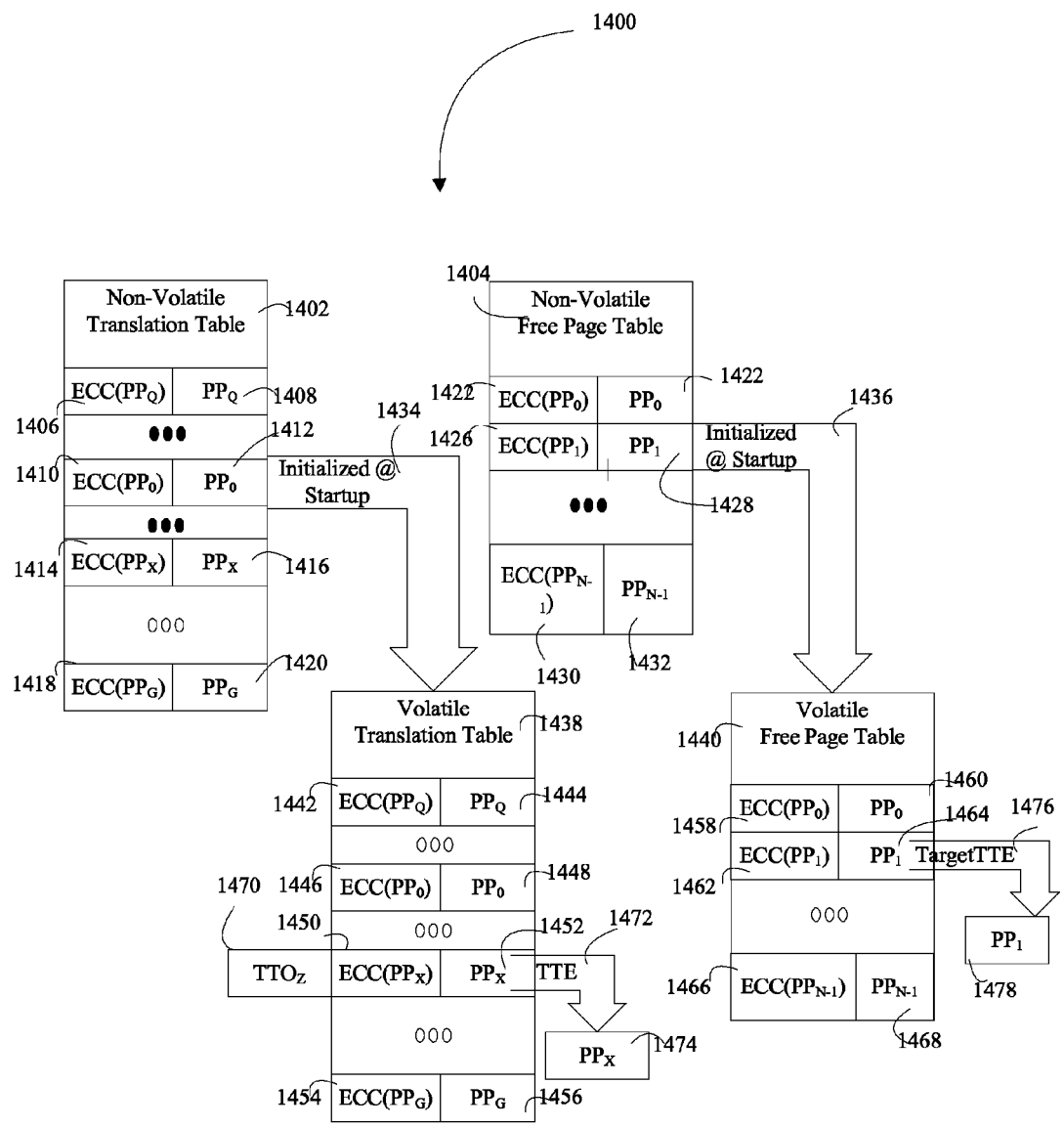
FIG. 14 depicts block diagram illustrating application of Error Code Corrections to the metadata and translations in a write operation, in accordance with an aspect of the disclosed subject matter.

Referring to FIG. 13, a block diagram of a translation table write buffer is shown, in accordance with the present innovation. For each way and set in the translation table set associative cache there exists a write buffer 1310 for recording transactions that modify the logical to physical address translation as in the case of a write operation. The write buffer 1310 is composed of two elements: the write buffer table index 1312 and the write buffer table 1316. It is assumed the non-volatile memory required to provide this support is in an initialized state, ready to be written. As such, when an operation requires the use of a write buffer the first step in the process is to write the table index value 1314 corresponding to the first available location of the write buffer table 1316. For example, in the illustrated aspect of FIG. 13, table index value "0" 1314-0 indicates the first available location of the write buffer table 1316.

The second step, after the first available table index value 1314-0 is written, is to record into the write buffer table 1316 at the given index the information that reflects the existing state of the system. In this case, the translation table offset (TTO) 1318-0, the physical page (PP) address of the last-in-time translation ("PREV") $1320\text{-}_{PREV}$, and a timestamp 1322-0 or equivalent value are written. The third step is the write the value of the next table index, which corresponds to the next available location of the write buffer table. For example, in the illustrated aspect of FIG. 10, table index value "1" 1314-1 indicates the next available location of the write buffer table 1316.

The fourth step is to record the translation table offset, the new physical page address ("CURR"). In this case, the translation table offset (TTO) 1318-1 and the PP address of the current translation ("CURR") $1320\text{-}_{CURR}$, are written. The fifth step in the sequence occurs after the data store operation completes. In the fifth step a timestamp or equivalent value is written to the translation table offset and the transaction is complete. In this case, timestamp 1322-1 is written. As stated above, it is assumed that the non-volatile memory required to provide this support is in an initialized state, ready to be written. 1318-F, 1320-F and 1324-F represent table entry locations in their initialized state, ready to be written. In the event of a sudden loss of power the changes to the translation table, which have not been recorded into the non-volatile translation table, will be reconstructed by examining the state of the various elements of the write buffer. By organizing the write buffer to reflect the organization of the cache, the process of reconstructing the information of the translation table is anticipated and by design changes are aggregated to facilitate that process.

Referring now to FIG. 11, a block diagram is depicted that illustrates a system 1400 for application of integrity checks, such as Error correction Codes (ECC) to the translated physical addresses/locations. Since the translation table represents the mapping of logical to physical addresses each element in the translation table is considered critical in nature and therefore protected from inaccuracy with an integrity check, such as an Error Correction Code (ECC). An integrity check, such as ECC, is generated and applied to each physical page in the non-volatile translation table 1402 and the non-volatile free page table 1404. For example, in the non-volatile translation table 1402, ECC ($PP_Q$) 1406 is generated and applied to physical page Q ($PP_Q$) 1408, ECC($PP_O$) 1410 is generated and applied to physical page O ($PP_O$) 1412, ECC($PP_X$) 1414 is generated and applied to physical page X ($PP_X$) 1416 and ECC($PP_G$) 1418 is generated and applied to physical page G ($PP_G$) 1420. Similarly, in the non-volatile free page table 1404, ECC($PP_0$) 1422 is generated and applied to free physical page O ($PP_0$) 1424, ECC($PP_1$) 1426 is generated and applied to free physical page 1 ($PP_1$) 1428, and ECC($PP_{N-1}$) 1430 is generated and applied to free physical page N−1 ($PP_{N-1}$) 1432 where N−1 is the last available free page. The ECC protecting the physical page is generated when assembling the elements of the free page table from which allocations are made.

At reset time (i.e., the start-up after an error or failure has occurred, such as power loss failure or the like) a verification or validation of the ECC occurs at the non-volatile translation table 1402 and non-volatile free page table 1404 to guarantee the information it represents is correct to the highest possible degree. If the validation/verification is successful, the non-volatile translation table 1402 and the non-volatile free page table 1404 are copied into volatile memory, as indicated by arrows 1434 and 1436, and result in volatile translation table 1438 and volatile free page table 1440. Similar to the non-volatile tables 1402 and 1404, each physical page in the volatile tables 1438 and 1440 will have a corresponding ECC. For example, in the volatile translation table 1438, ECC($PP_Q$) 1442 corresponds to physical page Q ($PP_Q$) 1444, ECC($PP_O$) 1446 corresponds to physical page O ($PP_O$) 1448, ECC($PP_X$) 1450 corresponds to physical page X ($PP_X$) 1452 and ECC ($PP_G$) 1454 corresponds to physical page G ($PP_G$) 1456. Similarly, in the volatile free page table 1440, ECC($PP_0$) 1458 corresponds to free physical page O ($PP_0$) 1460, ECC($PP_1$) 1462 corresponds to free physical page 1 ($PP_1$) 1464, and ECC($PP_{N-1}$) 1466 corresponds to free physical page N−1 ($PP_{N-1}$) 1468 where N−1 is the last available free page. If the verification/validation of the ECC is unsuccessful, the correction mechanism will be applied to the address, as designated by the translation table and provide the system with the data associated with that location.

$TTO_Z$ 1470 is the index into the translation table for the given operation. The arrow TTE 1472 indicates the content from the physical page X ($PP_X$) 1452 leading to block $PP_X$ 1474, which is the physical address provided to the data store flash management to apply for the given operation. Arrow TargetTTE 1476 represents the translation table entry including the physical address $PP_1$ 1478 provided to the data store flash management when a new address is required, as in the case of a write operation.

FIG. 12 illustrates a methodology and/or flow diagram in accordance with the disclosed subject matter. For simplicity of explanation, the methodology is depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodology in accordance with the disclosed subject matter. In addition, those skilled in the art will understand and appreciate that the methodology could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 15:
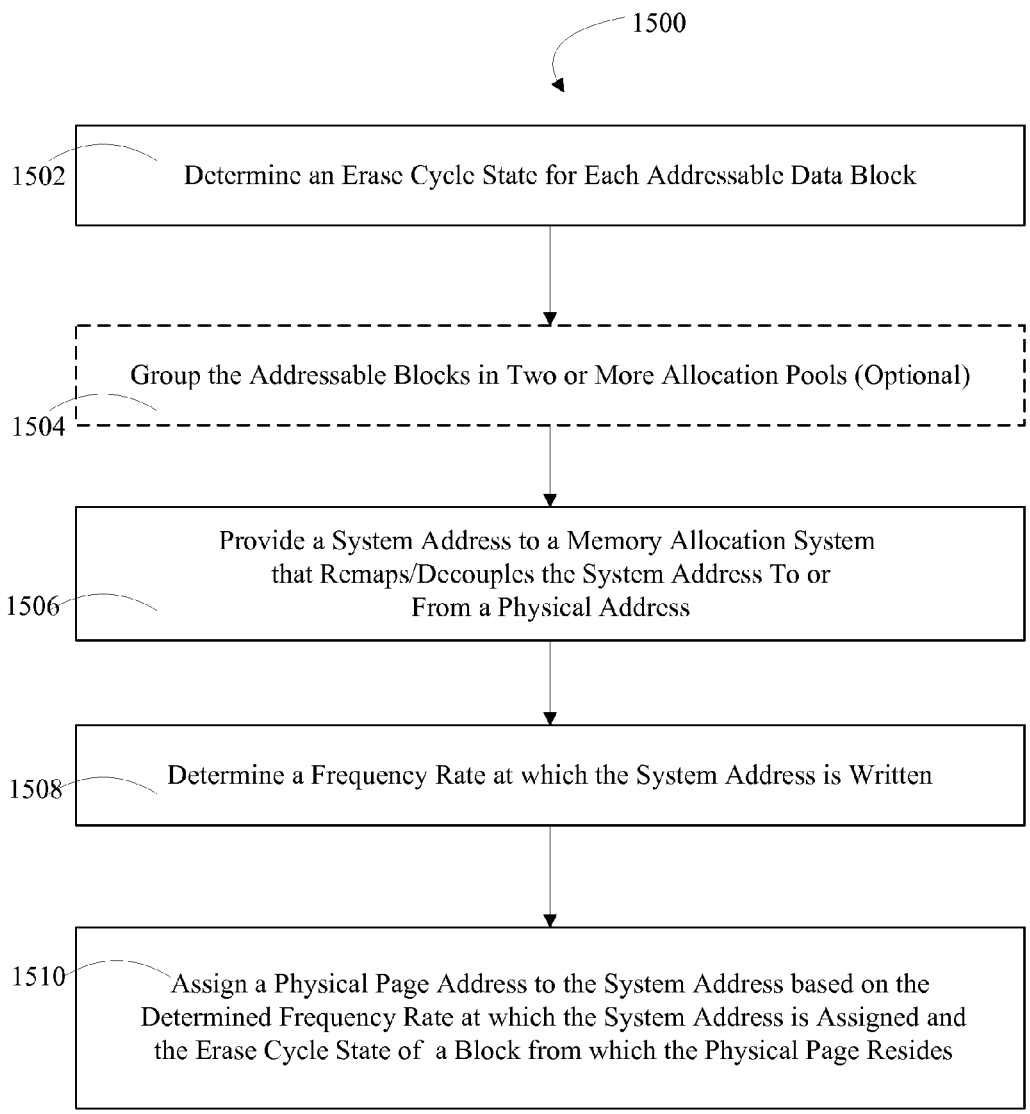
FIG. 15 illustrates a methodology for frequency distribution non-volatile memory allocation, in accordance with an aspect of the subject matter disclosed herein.

Turning to FIG. 15, illustrated is a methodology 1500 for frequency distributed non-volatile memory allocation, in accordance with an aspect of the disclosed subject matter. At Event 1502, an erase cycle state is determined for each addressable data block in the non-volatile memory. The erase cycle state may be defined as the quantity of erase cycles that each addressable data block has incurred. In one specific aspect, the system may determine the erase cycle state for each block by recording the number of erase operations that a block has received in an erase block table along with the history of frequency use for the block and the current frequency.

At optional Event 1504, the method may group the addressable blocks in two or more data block allocation pools such that each allocation pool includes addressable data blocks having different thresholds of erase cycle states. For example, in one specific aspect of the method, the system may operable to group data blocks in four allocation pools, wherein a first pool includes blocks having the lowest erase cycle state (i.e., fewest initializations/erasures), a second pool includes blocks having a next lowest (e.g., medium low) erase cycle state, a third pool includes blocks having a second from highest (e.g., medium high) erase cycle state, and a fourth pool includes blocks having the highest erase cycle state. The method may additionally include (not shown in FIG. 15), dynamically re-assigning data blocks to different pools based on the erase cycle state of each block. For example, as a block incurs addition erase cycles and meets or exceeds a data block pool threshold, the block may be moved from a pool that includes lower erase cycle state blocks to a pool that includes higher erase cycle blocks. Based on the number of times a block has been erased, data block pools are constructed prior to the process that services write operation page allocations.

At Event 1506, a system address is provided to a memory allocation system that decouples or otherwise remaps a system address to a physical address. As previously mentioned, by decoupling the system and physical addresses the addresses are no longer in a one-to-one relationship and data can be written to more random locations within the media. This provides for greater overall use of the entire storage media, thus allowing for greater cycle endurance (i.e., erase/program cycles) to be performed before the storage media is exhausted.

At Event 1508, a frequency rate is determined for the system address. The frequency rate may be defined as the number of times in which the system address has been written over a predetermined period of time. In one specific aspect, the system may determine the frequency rate of the system address by recording the count of write operations for a translation table offset (TTO) and dividing the write count by an predetermined internal system time interval.

At Event 1510, a physical page address is assigned to the system address based on the determined frequency rate at which the system address is being written and the erase cycle state of a block from which the physical page resides. In one aspect of the method, assigning the address may further include assigning a physical page address to the system address such that the determined frequency rate at which the system address is being written is inversely proportional to the erase cycle state of the block from which the physical page resides. In this regard, system addresses that are determined to have a high frequency rate are assigned physical page addresses/locations from blocks which have a lower erase cycle state and system addresses that are determined to have a low frequency rate are assigned physical page addresses/locations from blocks which have a high erase cycle state.

In one optional aspect of the method in which the addressable blocks are grouped in allocation pools, such as shown at Event 1504, assigning a physical page address may further include selecting a data block pool from which to assign a physical page address based on the determined frequency rate at which the system address is being written and the erase cycle state thresholds for each pool. In one aspect of the method, assigning a physical page address may further include assigning an address from a pool having a use frequency directly proportional to the determined frequency rate at which the system address is written. For example, a system address having a high frequency rate will be assigned a physical page address from a data block pool having a high frequency of use (i.e., a pool from which physical page addresses are assigned at a high frequency rate) and a system address having a low frequency rate will be assigned a physical page address from a data block pool having a low frequency of use (i.e., a pool from which physical page addresses are assigned at a low frequency rate).

It is to be appreciated and understood that the subject innovation is not limited by the acts illustrated and/or by the order of acts, as, for example, acts can occur in various orders and/or concurrently, and with other acts not presented and described herein. In one aspect, the memory component and the at least one other memory component can operate in parallel and/or an interleaved manner to service their respective subset of commands, such that each memory component can service its respective subset of commands at the same or substantially the same time as the other memory component(s) services its respective subset of commands to facilitate improved data access and retrieval.

In accordance with one embodiment, the data transfers can be de-centralized, such that each memory component can contain its own transfer buffer component, which can receive and store data associated with its subset of commands. Each memory component can provide the data stored in its transfer buffer component when all commands in its queue have been serviced. The data can be received from the memory components by the transfer controller component, and the transfer controller component can place the received data in its proper order in its transfer buffer component based in part on the transfer map. The transfer controller component can then transmit the data to the processor component.

The subject innovation can facilitate improved memory access and data retrieval, as compared to conventional systems, as each memory component can service data requests (e.g., commands in its queue) independent of the other memory components and/or can facilitate transferring the data to the transfer controller component, even when another memory component(s) has not finished servicing any or all of its respective subset of commands. At this point, methodology 1500 can end.

Figure 16:
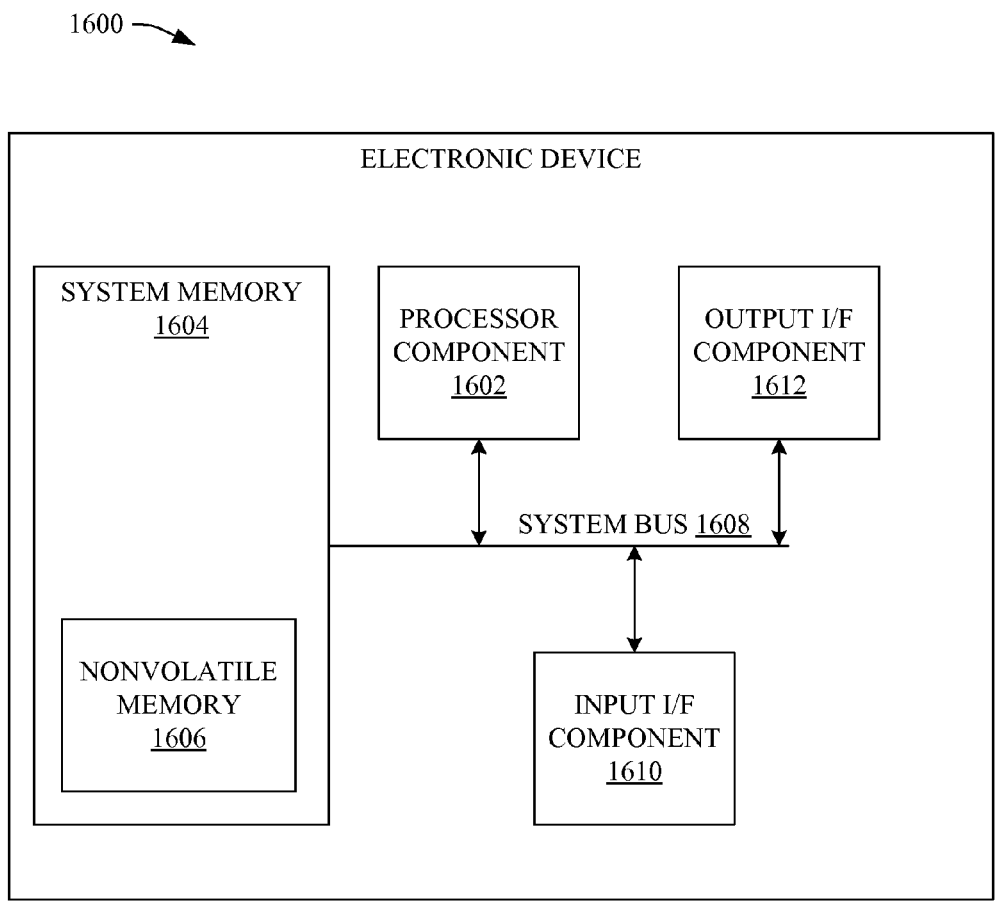
FIG. 16 illustrates an example of an electronic device that can be associated with a memory in accordance with an aspect of the disclosed subject matter.

Referring to FIG. 16, illustrated is a block diagram of an exemplary, non-limiting electronic device 1600 that can comprise and/or incorporate system 300, or a respective portion(s) thereof. The electronic device 1600 can include, but is not limited to, a computer, a laptop computer, network equipment (e.g., routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1600 can include, but are not limited to, a processor component 1602, a system memory 1604, which can contain a non-volatile memory 1606, and a system bus 1608 that can couple various system components including the system memory 1604 to the processor component 1602. The system bus 1608 can be any of several types of bus structures including a memory bus or memory controller, a peripheral bus, or a local bus using any of a variety of bus architectures.

Electronic device 1600 can typically include a variety of computer readable media. Computer readable media can be any available media that can be accessed by the electronic device 1600. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, non-volatile memory 1606 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1600. Communication media typically embodies computer readable instructions, data structures, program modules or other data in a modulated data signal such as a carrier wave or other transport mechanism and includes any information delivery media.

The system memory 1604 can include computer storage media in the form of volatile (e.g., SRAM) and/or non-volatile memory 1606 (e.g., flash memory). For example, non-volatile memory 1606 can comprise one or more memory components that can be the same or similar, or can contain the same or similar functionality, as memory components as described with regard to system 300, etc.). A basic input/output system (BIOS), containing the basic routines that can facilitate transferring information between elements within electronic device 1600, such as during start-up, can be stored in the system memory 1604. The system memory 1604 typically also can contain data and/or program modules that can be accessible to and/or presently be operated on by the processor component 1602. By way of example, and not limitation, the system memory 1604 can also include an operating system(s), application programs, other program modules, and program data.

The non-volatile memory 1606 can be removable or non-removable. For example, the non-volatile memory 1606 can be in the form of a removable memory card or a USB flash drive. In accordance with one aspect, the non-volatile memory 1606 can include flash memory (e.g., single-bit level cell flash memory, multi-level cell flash memory), ROM, PROM, EPROM, EEPROM, or NVRAM (e.g., FeRAM), or a combination thereof, for example. Further, a flash memory can comprise NOR flash memory and/or NAND flash memory.

A user can enter commands and information into the electronic device 1600 through input devices (not shown) such as a keypad, microphone, tablet, or touch screen although other input devices can also be utilized. These and other input devices can be connected to the processor component 1602 through input interface component 1610 that can be connected to the system bus 1608. Other interface and bus structures, such as a parallel port, game port or a universal serial bus (USB) can also be utilized. A graphics subsystem (not shown) can also be connected to the system bus 1608. A display device (not shown) can be also connected to the system bus 1608 via an interface, such as output interface component 1612, which can in turn communicate with video memory. In addition to a display, the electronic device 1600 can also include other peripheral output devices such as speakers (not shown), which can be connected through output interface component 1612.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

It is also to be understood and appreciated that cryptographic protocols can be employed to facilitate security of data associated with a memory in accordance with the disclosed subject matter. For example, a cryptographic component (e.g., cryptographic engine) can be employed and can facilitate encrypting and/or decrypting data to facilitate securing data being written to, stored in, and/or read from the memory. The cryptographic component can provide symmetric cryptographic tools and accelerators (e.g., Twofish, Blowfish, AES, TDES, IDEA, CAST5, RC4, etc.) to ensure that a specified partition in the memory component, or portions thereof, can only be accessed by those entities authorized and/or authenticated to do so. The cryptographic component can also provide asymmetric cryptographic accelerators and tools (e.g., RSA, Digital Signature Standard (DSS), and the like) to ensure that a specified partition in a memory, or portions thereof, only can be accessed by those entities that are authorized and certified to do so. Additionally, the cryptographic component can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in the memory is confined to those entities authorized to gain access.

It is to be appreciated and understood that authentication protocols can be employed to facilitate security of data associated with the memory in accordance with the disclosed subject matter. For example, an authentication component can solicit authentication data from an entity, and, upon the authentication data so solicited, can be employed, individually and/or in conjunction with information acquired and ascertained as a result of biometric modalities employed, to facilitate control access to the memory. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by the authentication component. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

As utilized herein, terms "component," "system," "interface," and the like, are intended to refer to a computer-related entity, either hardware, a combination of hardware and software in execution, and/or firmware. For example, a component can be a process running on a processor, a processor, a program, and/or a computer. By way of illustration, both an application running on a server and the server can be a component. One or more components can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Thus, present aspects herein described above provide for systems and/or methods for frequency distributed flash memory allocation. The present systems and methods determines the rate at which a system address is being written and the current erase cycle state of each data block in the non-volatile memory device and assigns a physical address to the write operation based on the determined system address rate and the current erase state of each data block in the non-volatile system. In this regard, system addresses that are assigned more frequently are assigned physical page addresses from data blocks which have a low erase cycle state (i.e., greater cycle endurance remaining) and system addresses that assigned less frequently are assigned physical page addresses from data blocks which have a high erase cycle state (i.e., lesser cycle endurance remaining). As result, less data has to be moved block-to block when recycling blocks, commonly referred to garbage collection, and, as a result, less initialization, i.e., erase cycles, are incurred by the non-volatile device. The result is a more robust non-volatile device having increased erase/initialization cycle endurance, which adds to the overall reliability of the device over time.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system for memory allocation in a computing system, comprising:
   a volatile memory device;
   a non-volatile memory device including blocks, each block having addressable physical pages;
   a memory allocation module stored in the volatile memory device and operable to allocate a physical page address to a system address, wherein the memory allocation module includes:
      system address rate logic operable to determine a frequency rate for a provided system address, wherein the frequency rate for the provided system address is determined based at least in part on a total number of write operations multiplied by a constant associated with a period for a write operation, plus a total number of read operations multiplied by a period for read operations, plus a total number of erase operations multiplied by an erase operation period in the non-volatile memory device;
      erase cycle state logic operable to determine an erase cycle state for each block in the non-volatile memory device;
      address assignment logic that assigns a physical page address to the system address such that the frequency for the provided system address is inversely proportional to the erase cycle state of the block from which the physical page resides, wherein the address assignment logic parses the system address into separate fields to determine whether a cache-line associated with the system address to physical address assignment is included in the non-volatile memory device; and
      block pooling logic that groups the blocks in two or more allocation pools, wherein each of the two or more allocation pools reflect blocks having different predetermined thresholds of erase cycle states.

2. The system of claim 1, wherein the system address rate logic is further operable to determine a number of times in which a system address is written over a predetermined period of time.

3. The system of claim 1, wherein the system address rate logic is further operable to determine the frequency rate for the provided system address by recording a count of write operations for a translation table offset and dividing the count by a predetermined time interval.

4. The system of claim 1, wherein the erase cycle state logic is further operable to record a quantity of erase cycles that each block has encountered.

5. The system of claim 1, wherein the erase cycle state logic is further operable to determine an erase cycles state by recording in an erase block table a number of erase operations that a block has received, a history of frequency use for the block and a current use frequency for the block.

6. The system of claim 1, wherein the address assignment logic is further operable to select a pool from which to assign a physical page address based on the determined frequency rate for the provided system address and the erase cycle state thresholds for the pools.

7. The system of claim 1, wherein the address assignment logic is further operable to assign a physical page address from a pool having a use frequency directly proportional to the determined frequency rate for the provided system address.

8. The system of claim 1, wherein the block pooling logic is further operable to dynamically re-assign a particular block to a different allocation pool associated with the two or more allocation pools based on the erase cycle state of the particular block.

9. An electronic device comprising the system of claim 1.

10. A method for memory allocation in a non-volatile memory device, comprising:
   providing for a system address;
   determining a frequency of writes associated with the system address based at least in part on total number of write operations multiplied by a constant associated with a period for a write operation, plus a total number of read operations multiplied by a period for read operations, plus a total number of erase operations multiplied by an erase operation period in the non-volatile memory device;

determining an erase cycle state for each addressable block;

assigning a physical page address to the system address such that the determined the frequency of writes associated with the system address is inversely proportional to the erase cycle state of a block from which the physical page resides and recording a bookend entry in the non-volatile memory device, wherein the bookend entry includes a previous system address to physical address translation and a current system address to physical address translation; and grouping addressable blocks in two or more allocation pools, wherein each of the two or more allocation pools reflect addressable blocks having different predetermined thresholds of erase cycle states.

11. The method of claim 10, wherein determining an erase cycle state further comprises recording a quantity of erase cycles that each addressable block has encountered.

12. The method of claim 10, wherein assigning a physical page address to the system address further comprises selecting a pool from which to assign a physical page address based on the determined frequency of writes associated with the system and the erase cycle state thresholds for the pools.

13. The method of claim 10, further comprising dynamically re-assigning a particular addressable block to a different allocation pool associated with the two or more allocation pools based on the erase cycle state of the particular addressable block.

14. The system of claim 1, wherein the address assignment logic assigns a physical page address to the system address based on the determined frequency rate at which the system address is written and the erase cycle state of a block from which the physical page resides.

15. The method of claim 10, wherein assigning a physical page address to the system address is based on the determined frequency of writes associated with the system and the erase cycle state of the block from which the physical page resides.

16. The system of claim 1, wherein the block pooling logic assigns one or more blocks to three or more different allocation pools.

17. The method of claim 10, wherein determining the erase cycle state further comprises recording in an erase block table a number of erase operations that a block has received, a history of frequency use for the block and a current use frequency for the block.

* * * * *